United States Patent [19]
Nihei et al.

[11] Patent Number: 6,061,152
[45] Date of Patent: May 9, 2000

[54] IMAGE PROCESSING APPARATUS AND METHOD FOR PROCESSING AN ORIGINAL IMAGE BASED ON A SPECIFICATION IMAGE FOR PRODUCING AN OUTPUT IMAGE BY COMPOUNDING A PROCESSED ORIGINAL IMAGE AND A COMPOUND IMAGE REAL FROM THE SPECIFICATION IMAGE

[75] Inventors: Makoto Nihei; Katsumi Masaki, both of Yokohama; Masayuki Takayama, Kashiwa; Hiroshi Netsu; Masashi Takizawa, both of Yokohama; Koji Kawamura, Kawasaki, all of Japan

[73] Assignee: Canon Kabushiki Kaisha, Tokyo, Japan

[21] Appl. No.: 08/990,778

[22] Filed: Dec. 15, 1997

Related U.S. Application Data

[63] Continuation of application No. 08/448,318, May 23, 1995, abandoned.

[30] Foreign Application Priority Data

| May 26, 1994 | [JP] | Japan | 6-112806 |
| May 26, 1994 | [JP] | Japan | 6-112807 |
| Jul. 28, 1994 | [JP] | Japan | 6-176668 |

[51] Int. Cl.⁷ .................................................. H04N 3/14
[52] U.S. Cl. ........................................ 358/448; 358/400
[58] Field of Search .................................. 358/400–402, 358/443, 448, 468, 450

[56] References Cited

U.S. PATENT DOCUMENTS

| 5,247,591 | 9/1993 | Baran | 358/402 |
| 5,274,468 | 12/1993 | Ojha | 358/448 |
| 5,287,199 | 2/1994 | Zoccolillo | 358/402 |
| 5,444,779 | 8/1995 | Daniele | 358/468 |
| 5,506,697 | 4/1996 | Li et al. | 358/448 |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image processing method and apparatus which makes possible image processing based on attribute specification contents specified by an attribute specification image by reading an original including an original image and the attribute specification image which specifies the contents of processings to be performed on the original image.

A scanner reads a format original containing bar codes indicating data attribute specifications such as character limit range, character color, etc. The read bar code patterns are analyzed and the attribute specification data such as character limit range, character color, etc. is stored in RAM once. Then, the original to be output is read and stored in RAM as image data. Processings (such as color conversion, etc.) corresponding to the aforementioned attribute specification data are performed in relation to this image data. After all of the processings specified by the attribute specification data has been carried out in relation to this image data, the resulting data is printed onto a printer.

17 Claims, 23 Drawing Sheets

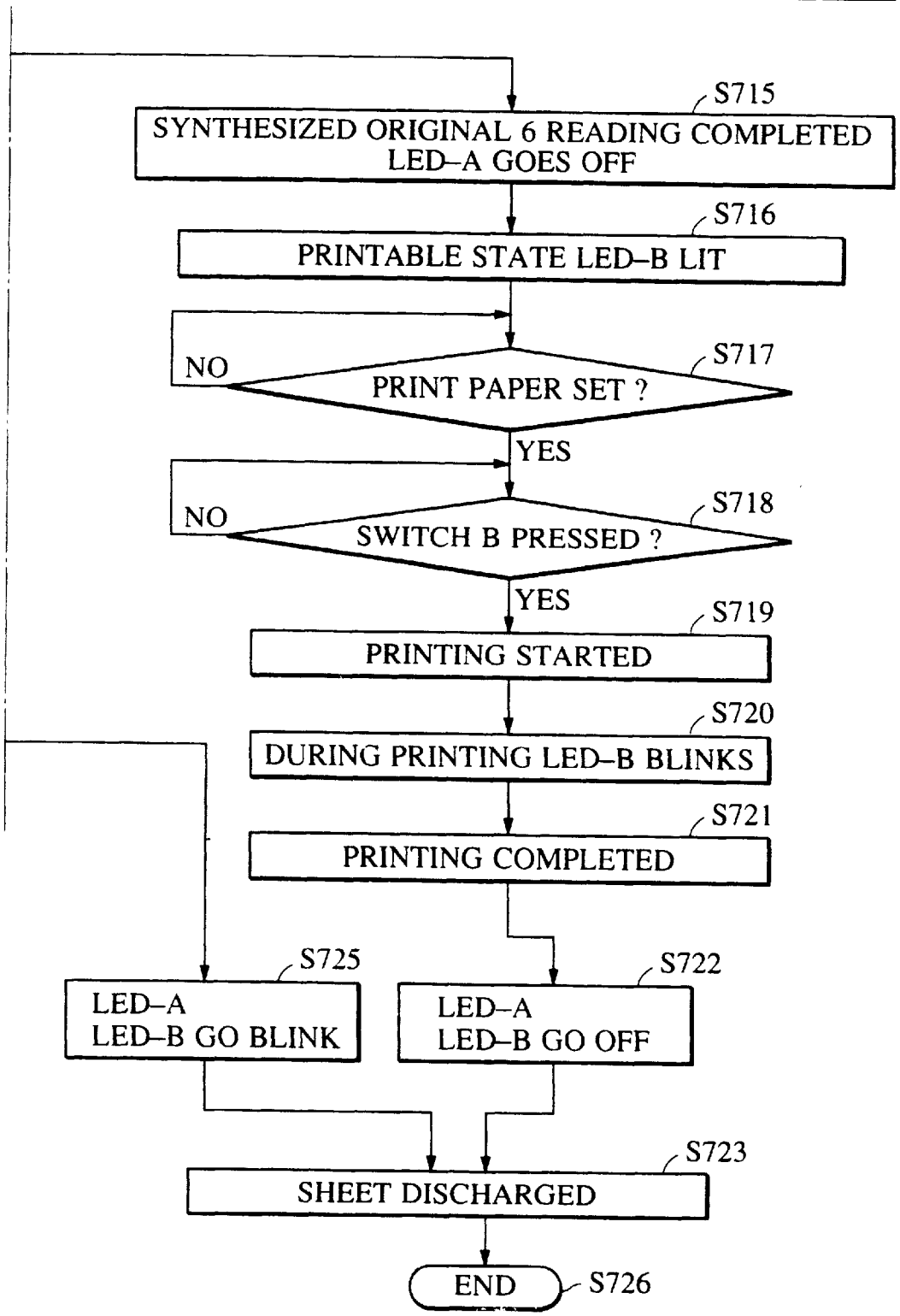

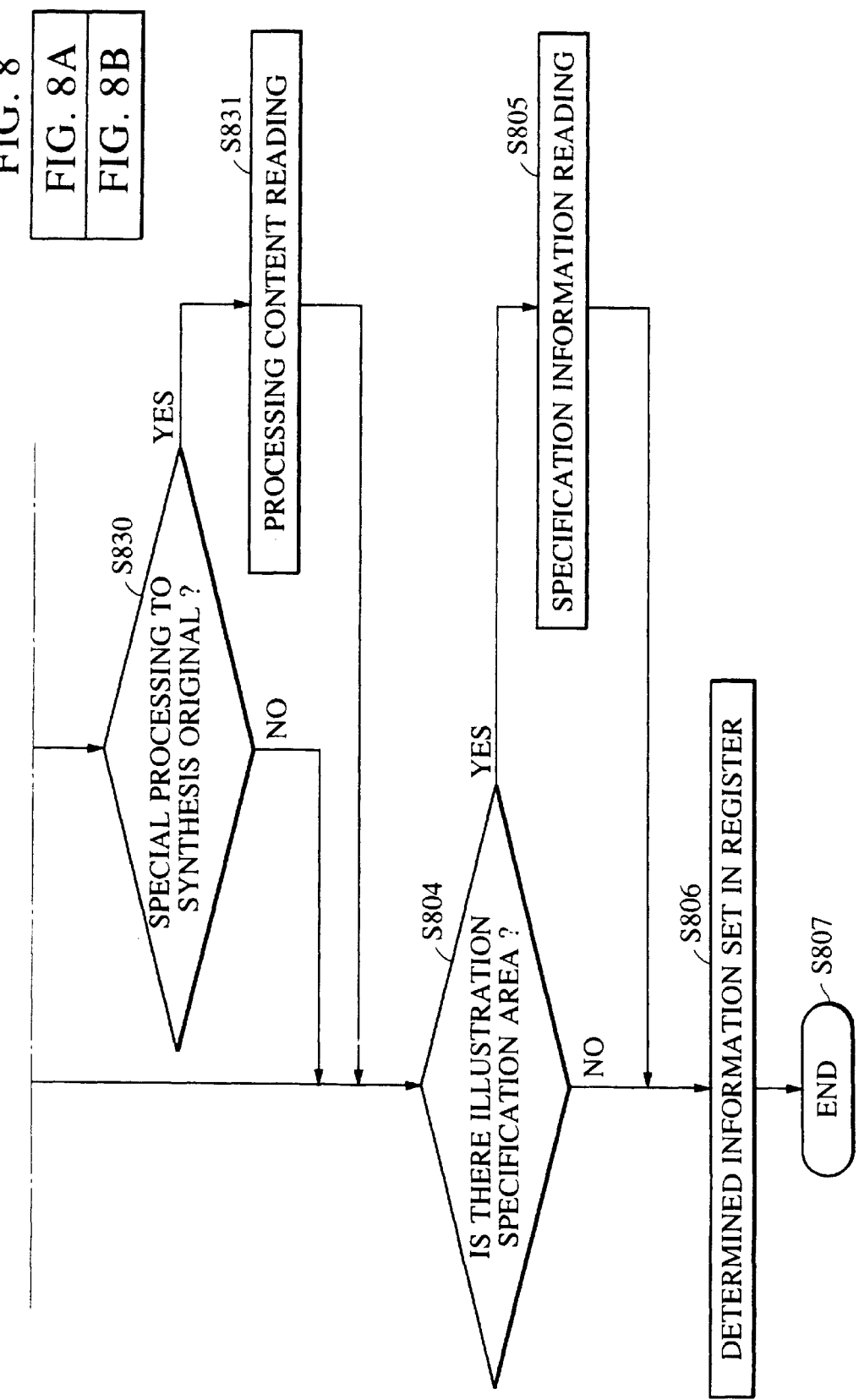

| FIG. 9A |
| FIG. 9B |

ILLUSTRATION PASTE POSITION
(HAS POINTER ABOVE ROM)

SEPARATED ILLUSTRATION POINTER 1

SEPARATED ILLUSTRATION Y SIZE

SEPARATED ILLUSTRATION X SIZE

FIG. 11(a)
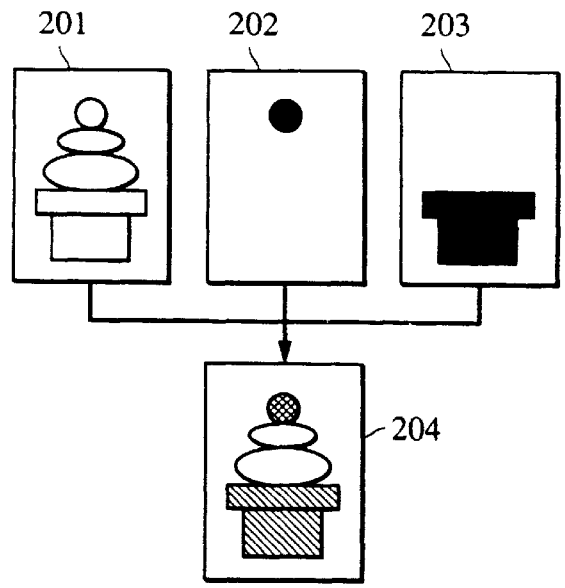
FIG. 11(b)
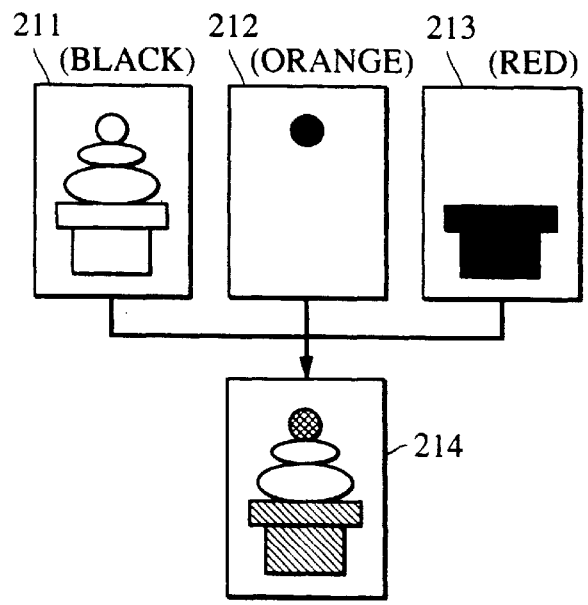
FIG. 11(c)
BLACK
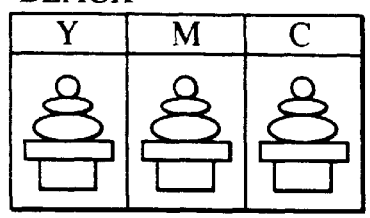
ORANGE
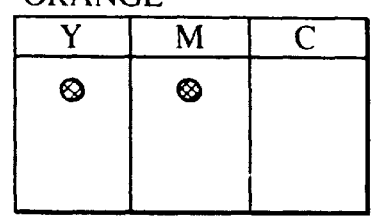
RED
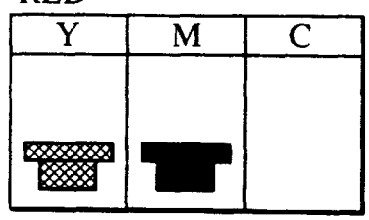

FIG. 15
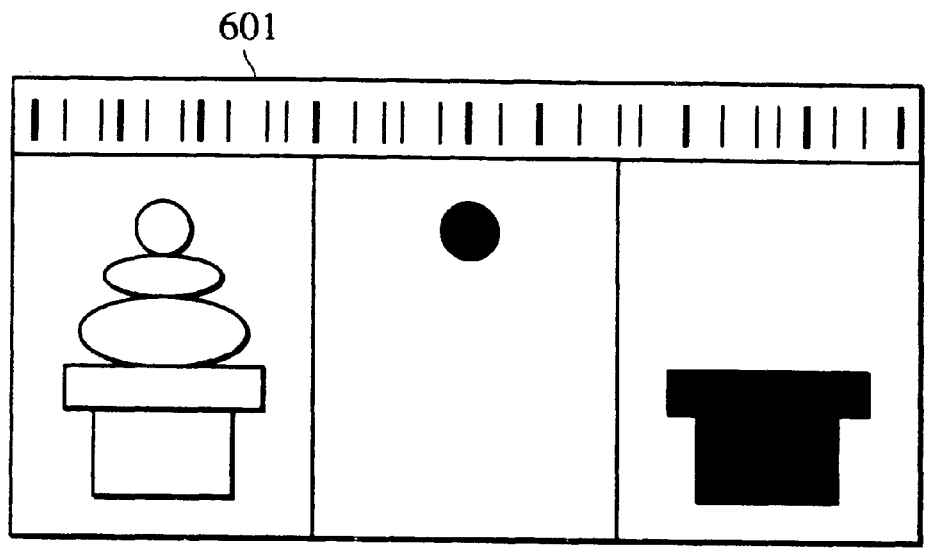
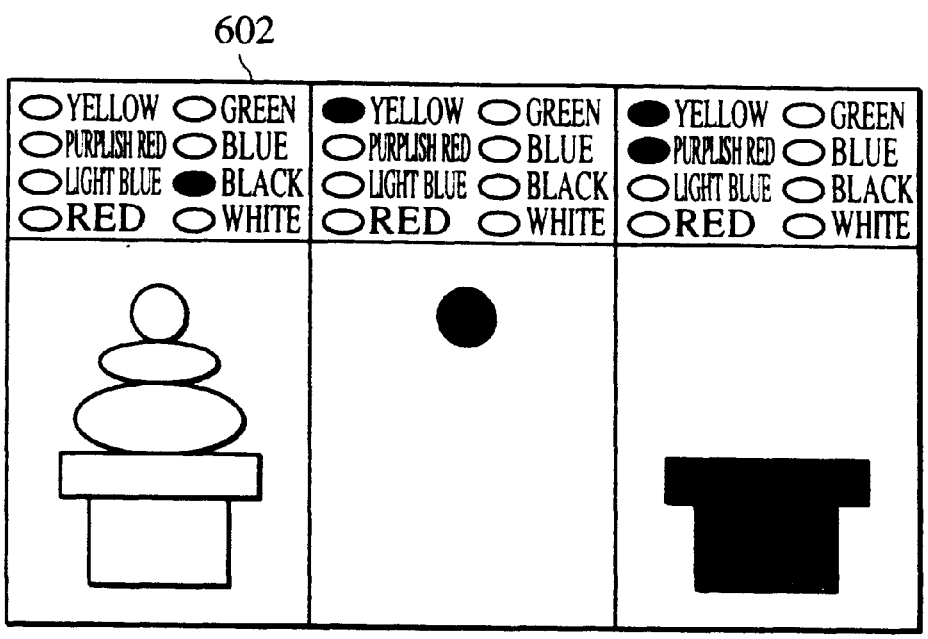

FIG. 17
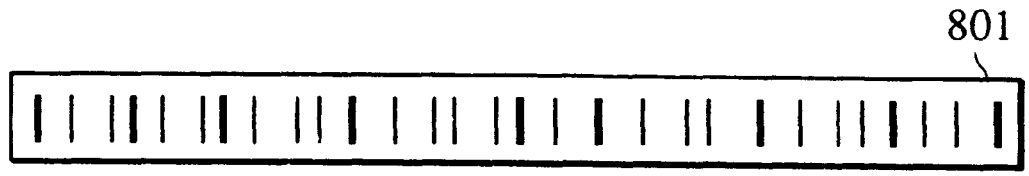
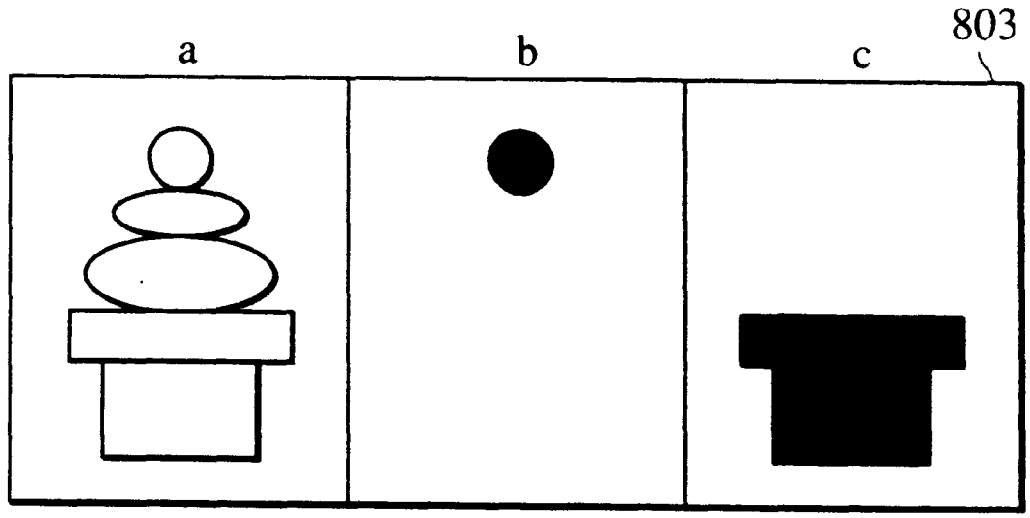

IMAGE PROCESSING APPARATUS AND METHOD FOR PROCESSING AN ORIGINAL IMAGE BASED ON A SPECIFICATION IMAGE FOR PRODUCING AN OUTPUT IMAGE BY COMPOUNDING A PROCESSED ORIGINAL IMAGE AND A COMPOUND IMAGE REAL FROM THE SPECIFICATION IMAGE

This application is a continuation of U.S. Ser. No. 08/448,318, filed May 23, 1995, now abandoned.

BACKGROUND OF THE INVENTION

1. Field of the Invention

The present invention relates to an image processing apparatus and method for processing an image based on format information read by an optical reader.

2. Description of the Prior Art

Hitherto, a construction such as that described below has been used to process an image obtained from an optical reader.

An example of means for easily obtaining a new image output from an original image is an electrophotographic machine (hereinafter referred to as copying machine). Usually, a copying machine is provided with scaling functions such as to, for example, perform enlargement or reduction of the original. In recent years, copying machines called color copying machines have been made available for providing a color output from the color document. In addition, in recent high-performance copying machines, intermediate processing is carried out based on digitized data to carry out scaling, for example, to enlarge or reduce the size of the image data, using software, while in color copying machines, the original image is subjected to color conversion, masking processing, trimming processing, etc. Such processings are carried out with a pen and, for example, a tablet built in the color copying machines. Further, there are many digitized copying machines capable of directly receiving image data from an information processor and outputting this received data as printed material.

More and more information processors, whose use has been increasing rapidly in recent years, represented by, for example, a personal computer (hereinafter abbreviated as PC) and a Japanese word-processor (hereinafter abbreviated as WP), have connected thereto an optical image reader (hereinafter referred to as scanner). In such information processors having a scanner connected thereto, an image is read by the scanner and the read data is received by a PC or WP body, after which the received image data is subjected to various image conversions by an image processing system constructed by software, followed by display of the converted image data on a display device or output of the image data as printed material from a printer. In image processing by software means at such body, users frequently perform various settings. Such settings include image scaling, color conversion, and trimming. In addition, the user can further perform desired character/figure/illustration settings and operations on image data read by the scanner on the PC or WP, so as to allow output of the image data subjected to these settings and operations.

However, the aforementioned conventional example has the following problems.

In digital color copying machines and color printers connected to a PC or the like, software is needed for image processing at the PC side, and the user cannot perform the desired image processing if he does not know how to use the software. In addition, PC, image processing software, color printer or digital color copying machine are very costly when purchased as a set, and the user cannot use it readily.

In processing the image received by PC or WP connected to a scanner, if the user does not thoroughly know how to use the scanner, PC/WP, and image processing software, he cannot obtain the desired result, so that he must repeat the trial-and-error method and take a long time to prepare the desired image. In addition, although recent image processing software has high performance so that it is capable of performing various functions, this, on the contrary, makes the software hard to use, so that the user tends to give up before obtaining a desired and satisfactory result.

Hitherto, there have been available image processing apparatuses in which an image input is achieved by inputting an image as it is in that form. For example, using a monochromatic or color scanner, a monochromatic or color image is directly input into an image processing apparatus to achieve image input.

For example, in inputting a color image such as a multi-colored illustration by a scanner to produce a color print, it is necessary for the scanner or input means to perform such processings as reading an image on the original created using, for example, the three primary, red (R), green (G), and blue (B), and to send the input data to an output device, etc. In addition, converting the read image data into, for example, a mesh pattern, is extremely troublesome.

When a monochromatic image having a mesh pattern is input using a monochromatic scanner, a moire pattern is occasionally produced, thereby making proper input difficult. In addition, an expensive color scanner is required to input a color image.

In the aforementioned prior art, however, the input means or scanner must be one, such as a color scanner, which is capable of dividing the color into each of R, G, and B components to read the image data, so that device costs and size become relatively high and large respectively. In addition, in the prior art when the original to be read contains a regular mesh pattern, the pattern interferes with the resolution of the CCD or scanner sensor, thereby resulting in the production of moire patterns and deterioration of the image quality. Further, in the aforementioned prior art, when the read image data is converted into, for example, a mesh pattern data, the apparatus is required to perform very complex tasks.

SUMMARY OF THE INVENTION

Accordingly, an object of the present invention is to provide an image processing method and apparatus which makes possible image processing based on an attribute specification content obtained by reading an original containing an original image and an attribute specification image used for specifying the contents of image processing to be performed with respect to the original image.

To achieve the above-described objects, the image processing apparatus of the present invention is so constructed as having:

reading means for reading an original containing an original image and a specification image used which specifies the contents of the image processings to be performed with respect to the aforementioned original image;

obtaining means for obtaining specification information by analysis of the aforementioned specification image;

processing means for processing original image data obtained by reading the original image based on the specification information; and output means for outputting the original image data processed by the aforementioned processing means.

According to the above-described construction, the original image and the specification image are read by the reading means, and the contents of the image processings to be performed with respect to the original image data is obtained based on the specification image data read by the reading means. Based on the obtained specification information, image processing is performed with respect to the original image data, and the resulting data is output.

Other objects and features of the invention will become apparent from the following description of the specification and the drawings.

BRIEF DESCRIPTION OF THE DRAWINGS

FIGS. 7a–7b is a flowchart illustrating the process from reading a format original to outputting the printed result;

FIGS. 8a–8b is a flowchart illustrating reading operations of a bar code section, mark sheet section, and illustration area;

FIGS. 11a–11b is a view illustrating an exemplary example to describe the second embodiment;

FIG. 15 is a view illustrating an exemplary example to describe the fourth embodiment;

FIG. 17 is an exemplary diagram illustrating an example to describe the fifth embodiment;

DESCRIPTION OF THE PREFERRED EMBODIMENTS

Figure 1:
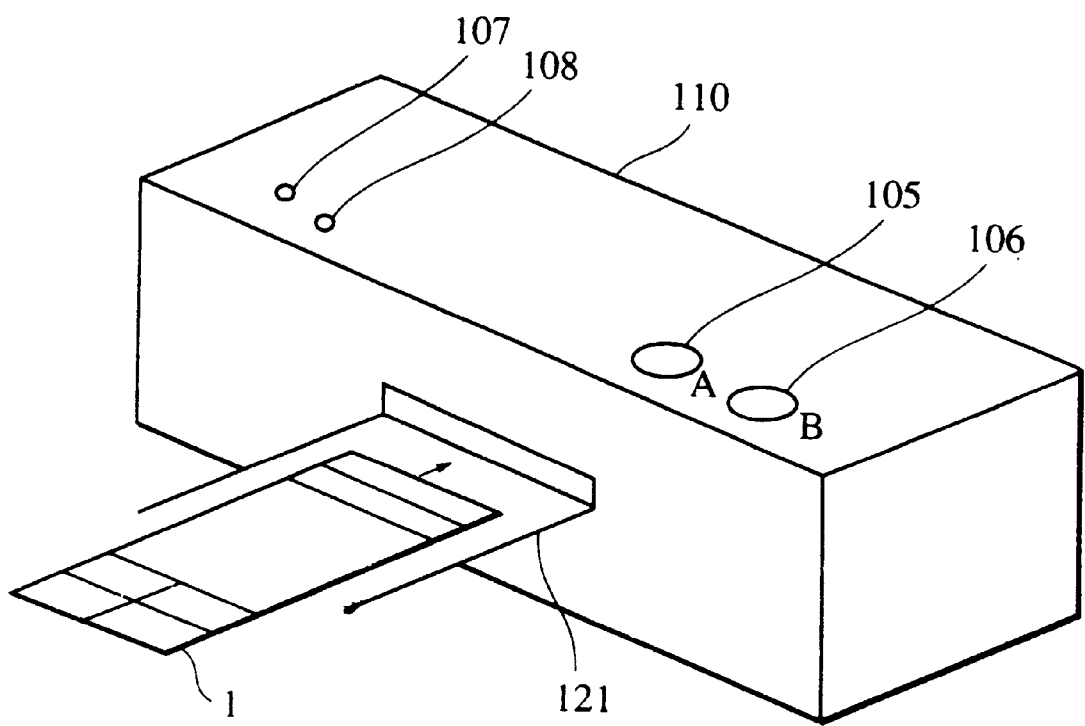
FIG. 1 illustrates an information processor in which a format original is read to output a synthesized image.
Figure 2:
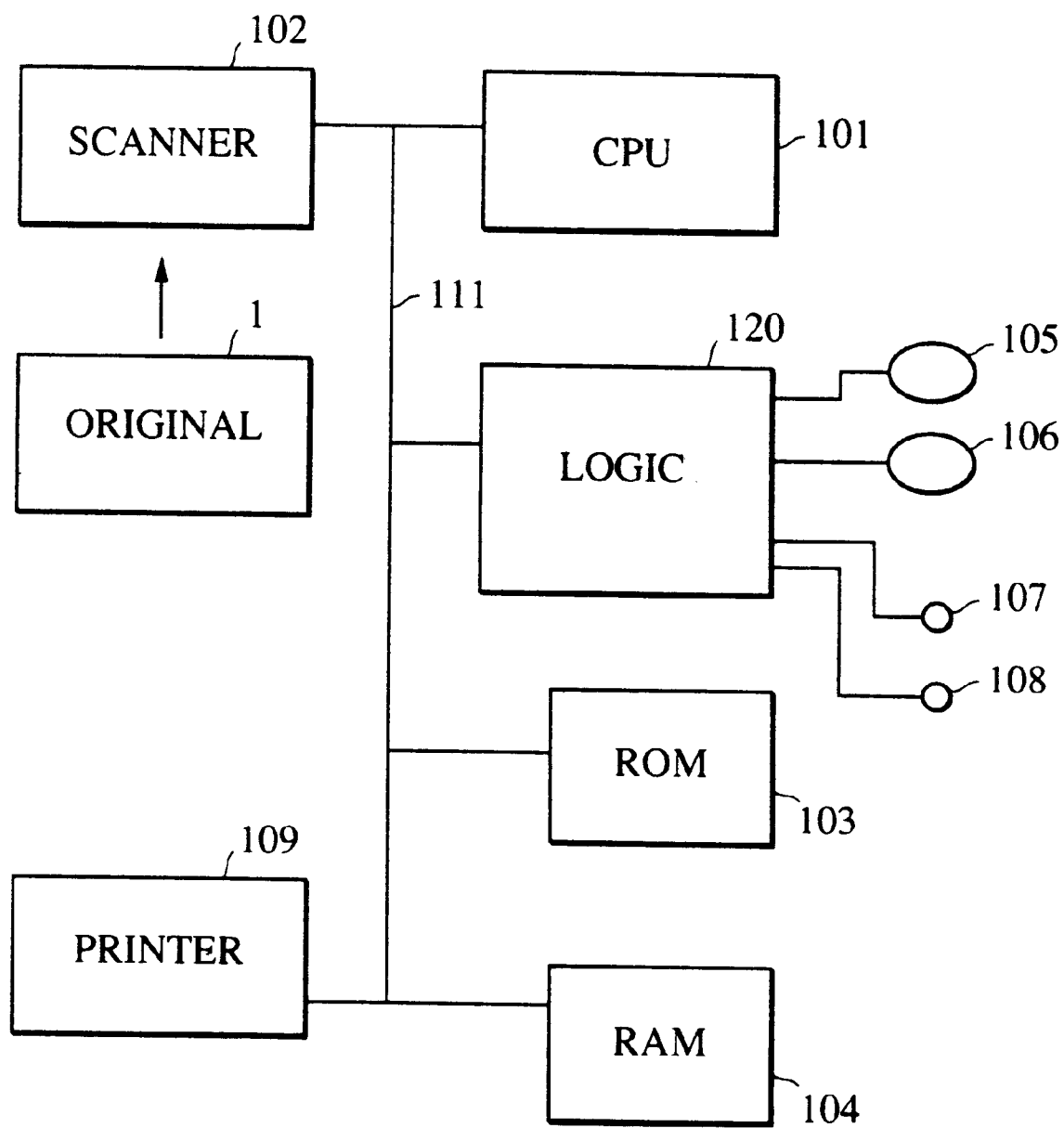
FIG. 2 is a block diagram of an image processing apparatus interior.
Figure 3:
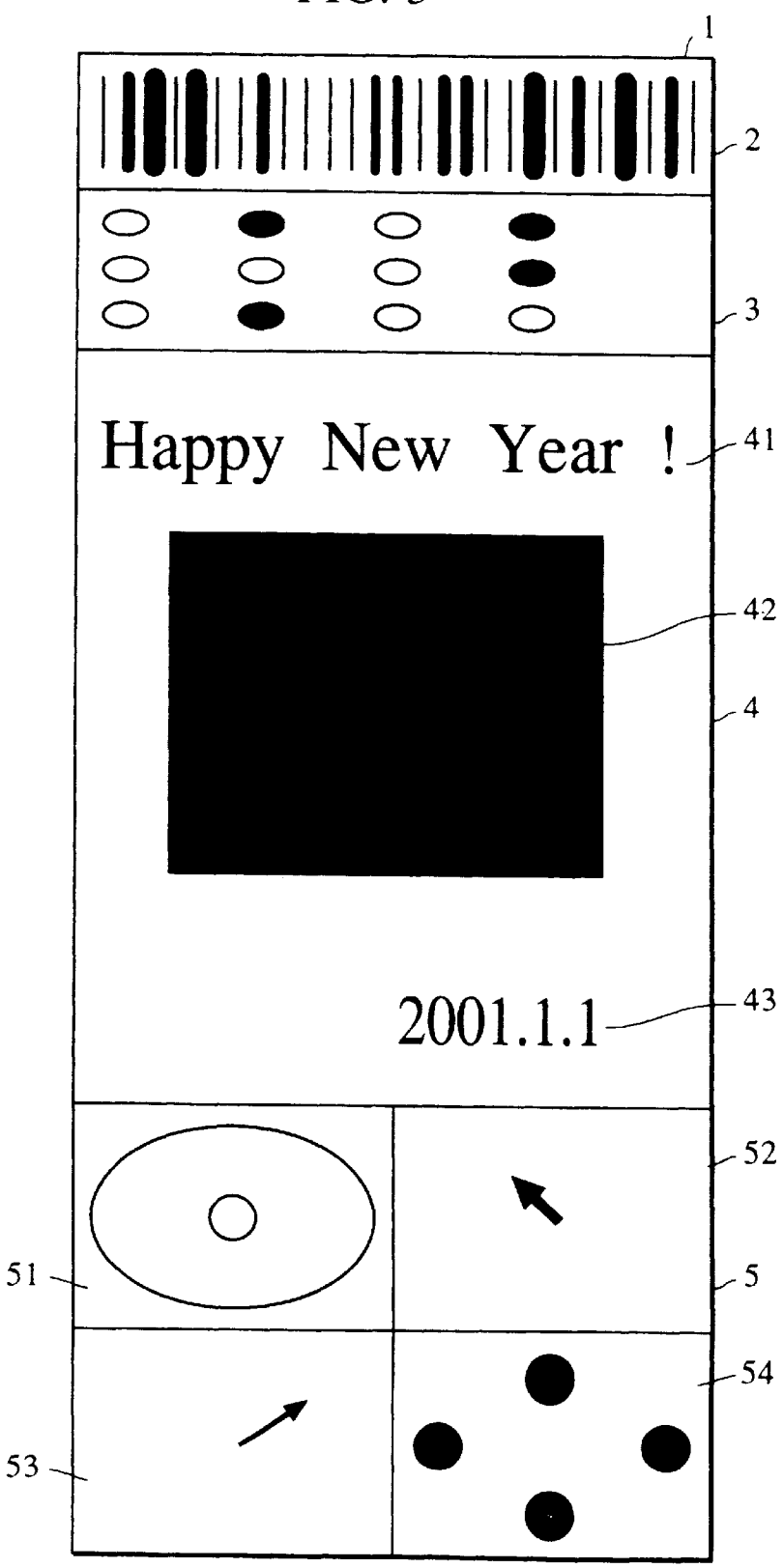
FIG. 3 illustrates a format original using a format specification in the present invention.

FIGS. 1 and 2 each illustrate an information processor which is allows input of a format original illustrated in FIG. 3 produced by the format specification method in the present invention and is capable of outputting a synthesized image. Reference numeral 110 denotes an information processor body; reference numeral 105 denote a first switch means (hereinafter referred to as switch A); reference numeral 106 denotes a second switch means (hereinafter referred to as switch B); reference numeral 107 denotes a first indicator means (hereinafter referred to as LED-A); reference numeral 108 denotes a second indicator means (hereinafter referred to as LED-B); and reference numeral 121 denotes a guide device which allows insertion of the format original 1. FIG. 2 is a block diagram illustrating an internal arrangement of the information processor 110. Reference numeral 102 denotes an optical image reader (hereinafter referred to as scanner) in which information on the format original 1 is read by an optical means. This reader is provided with a function (not illustrated) wherein the format original 1 is automatically transported by means (not illustrated), followed by reading of the entire format original, after which the read signal is converted into understandable information by a digital circuit. Reference numeral 101 denotes a central information processor (hereinafter referred to as CPU), which reads program code or data from a read-only memory (hereinafter ROM) 103. ROM has data or program codes stored therein and is controlled by the CPU 101 or logic 120. Reference numeral 104 denotes a random access memory (hereinafter RAM), which is controlled by the CPU 101 to hold data in a readable and writable form. Reference numeral 120 denotes a logic, which along with the CPU 101, controls the scanner 102, a printer 109, ROM 103, RAM 104, the switch A 105, switch B 106, LED-A 107, and LED-B 108. Reference numeral 111 denotes a bus line, by which signals are transmitted and received between the CPU 101, the switch 102, the printer 109, ROM 103, and RAM 104. The switch A 105 and the switch B 106 are each connected to the logic 120, so that when a user presses either of the switches, it is detected as a change in signal by the logic 120. The LED-A 107 and LED-B 108 are each turned on or off by the control operation of the logic 120. Reference numeral 109 denotes a recording device (hereinafter printer), which is controlled by the logic 120 and the CPU 101 to perform printing on a recording medium (not illustrated).

A description will be given of a format original with reference to FIG. 3.

FIG. 3 illustrates a first embodiment which best represents the present invention. Reference numeral 1 denotes a format original produced by the format method in the present invention. The format original 1 is a monochromatic image. Reference numeral 2 denotes a bar code area which is printed on the format original 1, and includes data regarding format specification information of the format original. Reference numeral 3 denotes a mark sheet area of the format original, wherein specified dots are filled or checked by a user using a pencil, ballpoint pen, or other recording means, so that he can obtain a desired formation specification. Reference numeral 4 denotes a format original layout area, wherein reference numeral 41 denotes a first character area, reference numeral 43 denotes a second character area, and reference numeral 42 denotes an image synthesis area. Reference numeral 5 denotes a color-separated illustration specification area, which comprises four divisions, namely a first color specification area division 51, a second specification area division 52, a third color specification area division 53, and a fourth color specification area division 54.

Figure 9A:
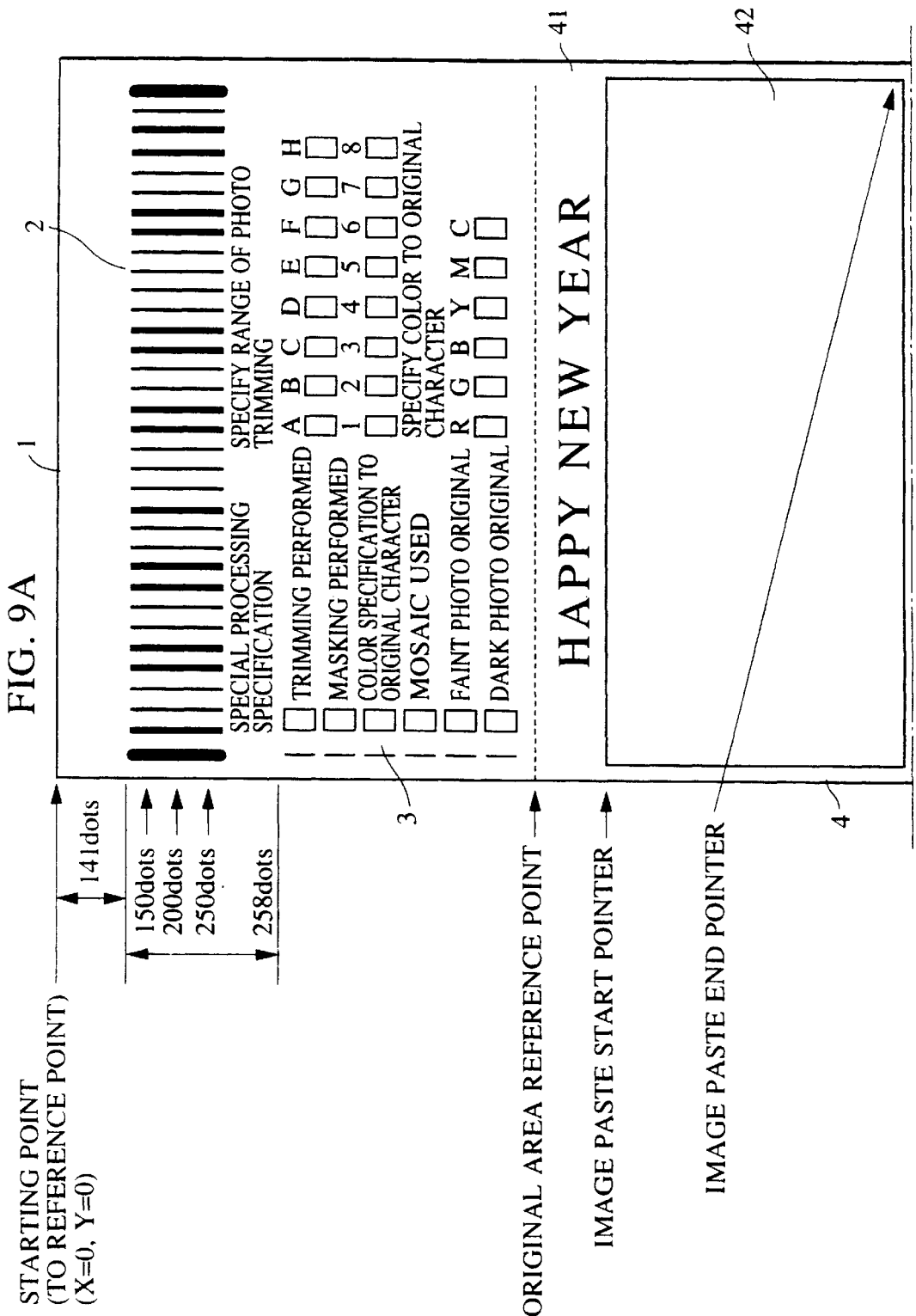
FIGS. 9a–9b illustrates a format original using the format specification in the present invention.
Figures 9, 9B:
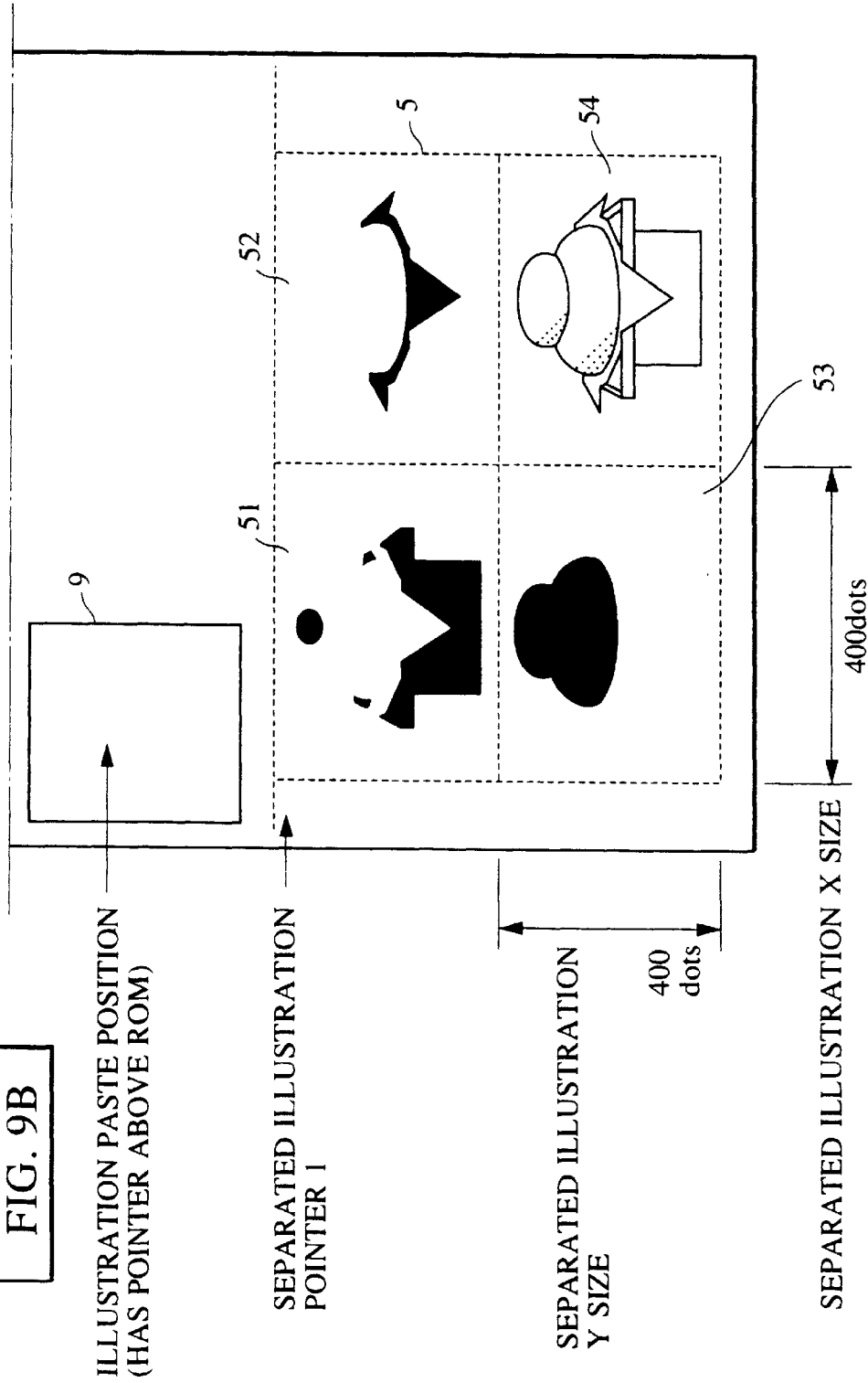

With reference to FIG. 9, a detailed description will be made of the format original produced by the format specification method in the present invention.

In FIG. 9, the same areas as those of FIG. 3 are given the same reference numerals. Reference numeral 1 denotes a format original produced by the format specification method in the present invention, which, at least, includes a bar code area 2, a mark sheet area 3, a format original layout area 4, a color-separated illustration area 5, and place 9 for pasting the illustration 5. The stripes of the bar code area 2 are formed in three difference thicknesses of 4 dots, 10 dots, and 16 dots. They indicate starting from the left with every 6 stripes, image processing information regarding the number of dots from the starting point to the original area reference point in the x dimension, the number of dots from the starting point to the original area reference point in the y dimension, the number of dots from the original area reference point to the image pasting start pointer in the x dimension, the number of dots from the original area reference point to the image pasting start pointer in the y dimension, the number of dots from the original area reference point to the image pasting end pointer in the x dimension, the number of dots from the original area reference point to the image pasting end pointer in the y dimension, the number of dots from the starting point to the separated illustration pointer in the x dimension, the number of dots from the starting point to the separated illustration pointer in the y dimension, the number of dots representing the size of the separated illustration in the x dimension, the number of dots representing the size of the separated illustration in the y dimension, one-point illustration position, whether the image to be pasted is a photograph or an illustration, whether masking is to be carried out, etc.

The desired format specification items in the mark sheet area 3 is marked or checked by a user using a pencil, ballpoint pen, etc., to allow him to perform trimming, specification of the trimming range, specification of color to original character, display of mosaics, faint photograph original processing, dark photograph original processing, etc. The color-separated illustration area 5 is divided into Y (yellow), M (magenta), C (cyan), and K (black) divisions, each of which are 400 dots×400 dots large. The illustration pasting place 9 is 400 dots×400 dots large. In the embodiment, although the sizes of the illustration pasting place 9 and each of the color-separated illustration divisions are the same, they may be formed into different sizes.

Figure 4:
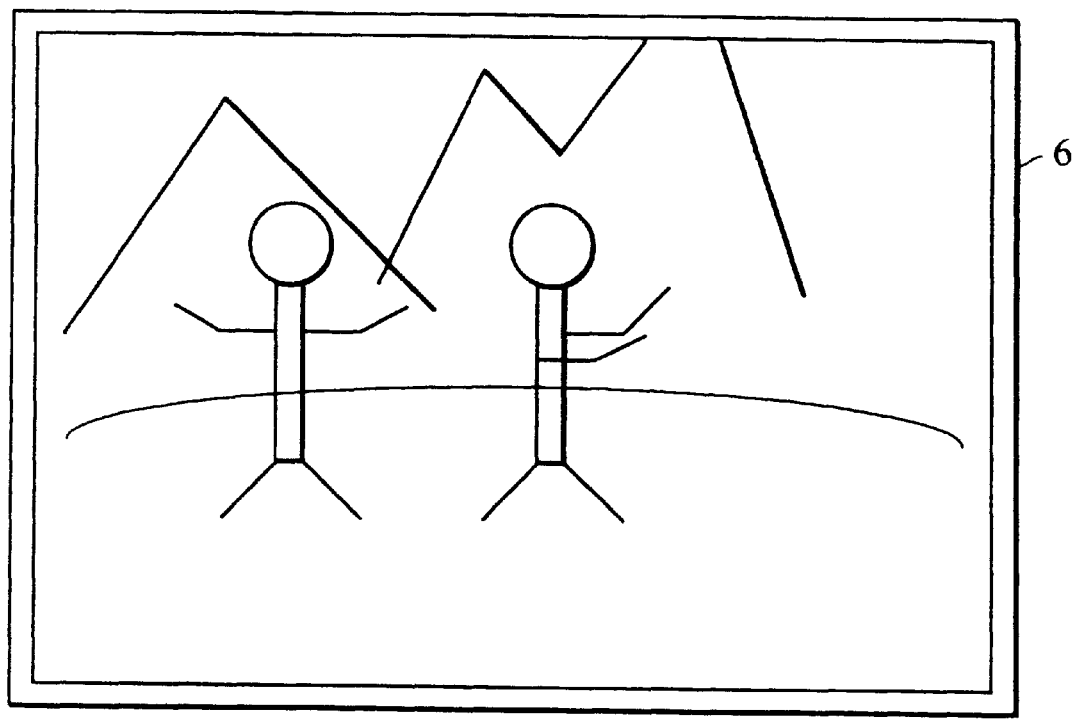
FIG. 4 illustrates a photograph used for image synthesis.

FIG. 4 illustrates a synthesis original 6 used for performing synthesis into the format specified in the format original 1. For the synthesis original, an existing original such as a color photograph, or characters or pictures prepared by an operator may be used.

Figure 5:
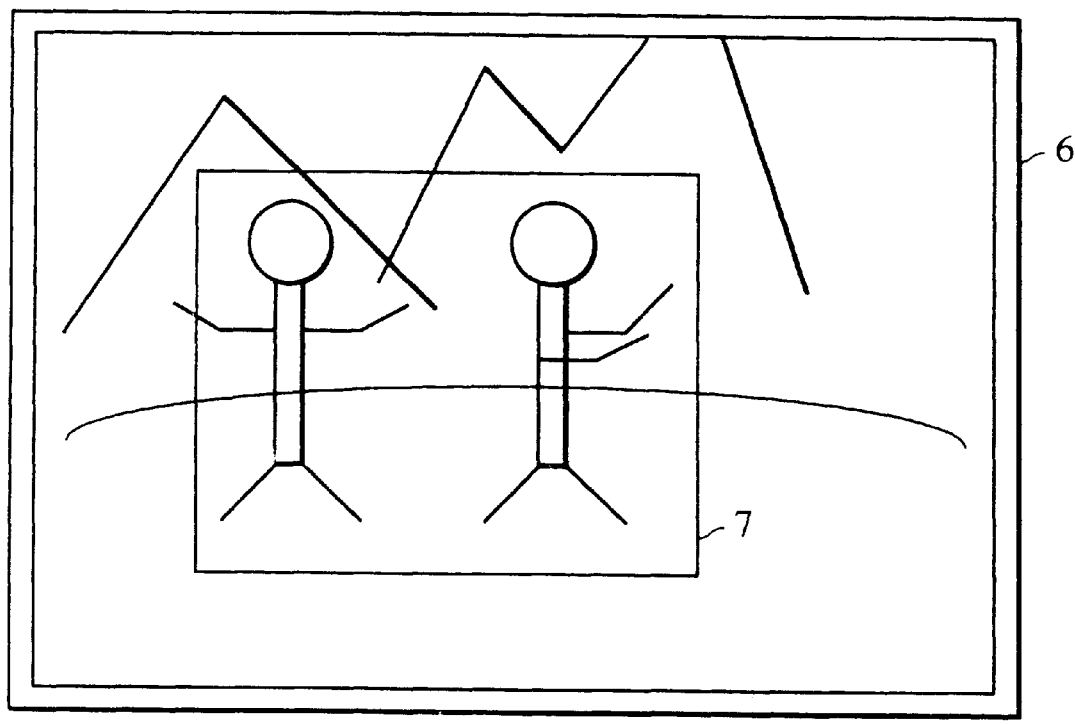
FIG. 5 illustrates an area to be actually synthesized in a photograph to a synthesis area.

FIG. 5 illustrates more clearly area 7 to be synthesized in the synthesis original 4 of FIG. 4 with the image synthesis area 42.

Figure 6:
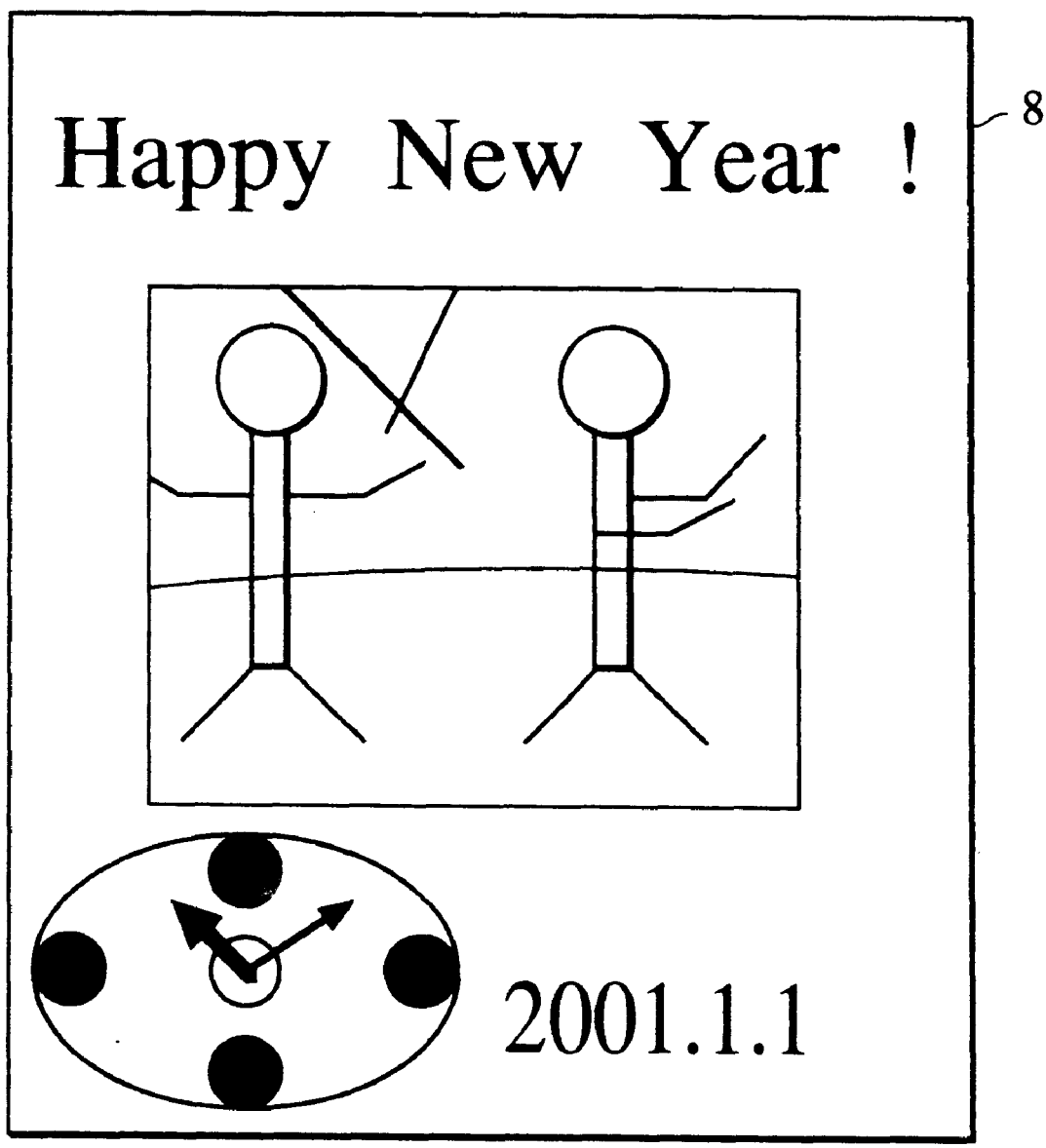
FIG. 6 illustrates an output of a synthesis of the format original of FIG. 3 and the photograph of FIG. 4.

FIG. 6 illustrates an output 8 produced by synthesis using the format original 1 and the photograph 6. Although in FIG. 6, the image is displayed as a monochromatic image, the actual image is displayed as a color image.

Figure 7A:
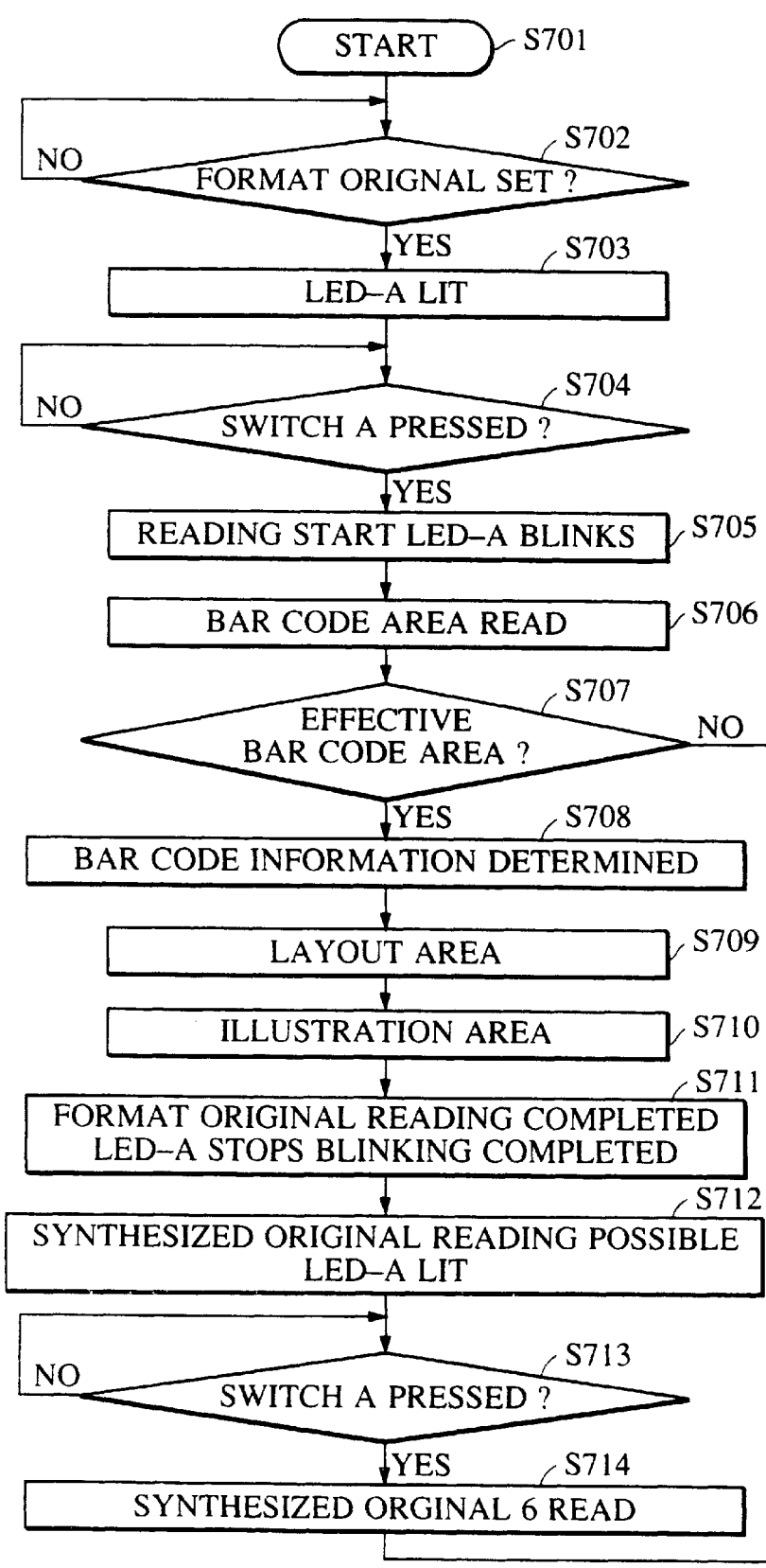
Figure 8A:
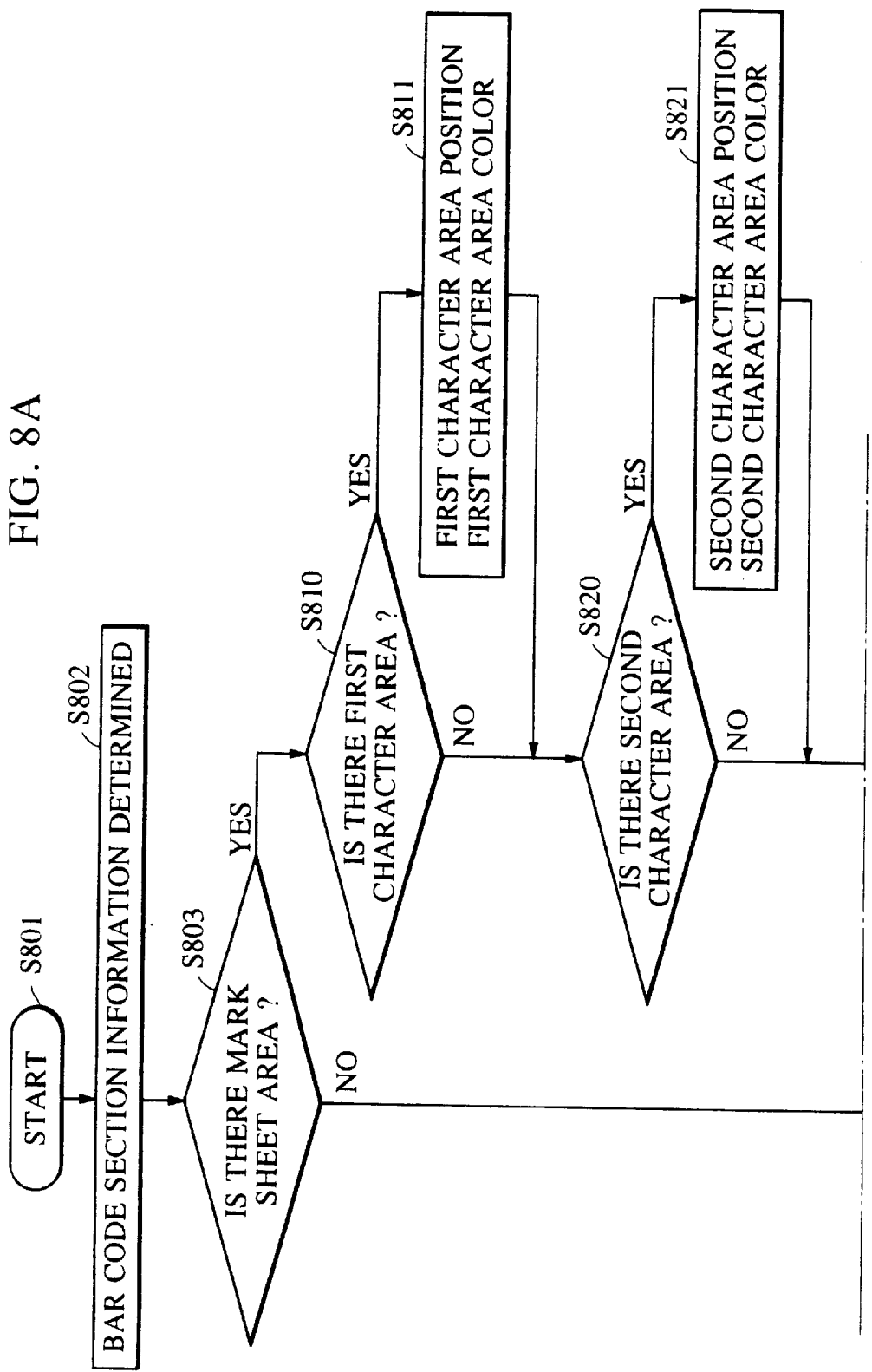

FIGS. 7 and 8, each of which are flowcharts, will be used to describe the operation.

When a supply means (not illustrated) of an information processor 110 is turned on, the information processor will be in a starting state at Step S701 of FIG. 7. Then, when the format original 1 is set in the information processor 11, a determination is made, in Step S702, that the original is set by a determination routine (wherein a determination is made as to whether or not an original is set). Thereafter, in Step S703, LED-A 107 is turned on, which indicates to the user that a determination has been made that the original is set.

When the user presses the switch A 105, the logic 120 detects this operation, and transmits this detected information in the form of signals to the CPU 101. In Step S704, a determination is made that the switch is pressed and the process proceeds to Step S705 to start reading operation. The blinking LED-A indicates to the user that reading operation has started. The scanner 102 successively reads information on the original as black-and-white binary information while the format original 1 is successively transported by a paper transporting means not illustrated), and the read data is sent to the CPU 101. The bar code on the format original is read and analyzed at three places.

Next in Step S707, the bar code area data is read by means of bar code area reading routine, followed by determination in Step 707 as to whether the bar code area is effective or ineffective by means of the bar code area determination routine. When it is determined that it is ineffective, the process proceeds to Step S725 where error processing is performed. Both LED-A 107 and LED-B 108 blink and, in Step S723, by means of the format original discharge routine, the format original 1 is discharged from the scanner 102, and the process is completed at Step S726.

When the bar code area is determined as effective by the bar code area determination routine in Step S707, then, in Step S708, bar code data analysis is performed by a bar code information obtaining routine.

The processing by the bar code information analysis routine in Step S708 will be described in detail with reference to the flowchart of FIG. 8. The bar code area data determined as being effective in Step S707 in FIG. 7 is analyzed by a bar code section information analysis routine of Step S802 of FIG. 8, reading is carried out of information regarding processing performed on the synthesis original 6 to be read in Step S714 of FIG. 7 such as the size, direction, the synthesis position of the synthesis image, whether or not there is rotation of the synthesis image, scaling direction, scaling rate of the synthesis image, etc. Thereafter, the scanner 102 transports the format original 1 and reads the mark sheet specification area 3 of the format original 1. When, in Step S803, a determination is made that there is no mark sheet area on the format original 1 by the mark sheet area determination routine, the format original 1 is further transported and the layout specification area 4 is read, after which the process proceeds to the illustration specification area determination routine of Step S804.

When, in Step S803, it is determined that there is a mark sheet area, the process proceeds to a first character area determination routine of Step S810. When, in Step S810, it is determined that there is a first character area, then, the process proceeds to Step S811, wherein the first character area position and the first character area color specification information are read. The process, then, proceeds to a second character area determination routine of Step S820.

When, in Step 810, it is determined that there is no first character area, the process proceeds to a second character area determination routine. When it is determined that there is a second character area, then, in Step S821, the second character area position and the second character area color specification information are read, and the process proceeds to a routine in Step S830 to determine whether or not to perform a special processing on the synthesis original.

When, in Step S820, it is determined that there is no second character area, the process proceeds to the routine in Step S830 to determine whether or not to perform a special processing on the synthesis original. When, in Step S830, it is determined that a special processing is to be performed, the process proceeds to a synthesis processing content determination routine of Step S831, wherein processing information is read. The process, then, proceeds to Step S804.

When, in Step S830, it is determined that no special processing is to be performed on the synthesis original, the process proceeds to Step S804.

When, in Step S804, it is determined that there is an illustration specification area in the illustration specification area routine, the process proceeds to a specification information reading routine of Step S805, while, on the other hand, when it is determined that there is no illustration specification area, the process proceeds to Step S806.

In Step S805, when the illustration area specification information is read by the specification information reading routine of Step S805, the process proceeds to Step S806.

In Step S806, the read information is set in a register means (not illustrated), and the process is completed at Step S807.

In Step S709 of FIG. 7, the layout specification area 4 on the format original 1 is successively read by a layout area reading routine of Step S709, and this read data is set in RAM 104.

If it is determined that there is an illustration specification area based on the information obtained by the illustration specification area determination routine of Step S806 and if this information is set in the register means, this information is used to read the illustration specification area 5 of the format original 1. Based on color information corresponding to, respectively, each of the images of the first color specification area division 51, the second color specification area division 52, the third color specification area division 53, and the fourth color specification area division 54, of the illustration specification information, read in Step S805 and set in Step S806, an image obtained from the four specification areas on RAM 104 are synthesized. The position of the generated illustration is determined by the information obtained in Step S805.

When reading of the illustration specification area 5 is completed, the process proceeds to a format original reading completion routine of Step S711. The LED-A 107 blinks to indicate to the user that format original reading is completed. When the read format original 1 is removed, the process proceeds to a synthesis image readable routine of Step S712.

In executing the synthesis image readable routine of Step S712, the LED-A 107 is turned on to urge the user to set the synthesis original. Then, the process proceeds to a switch A 105 depression detection routine of Step S713.

When, in Step S713, it is detected that the switch A 105 is pressed by a switch A 105 depression detection routine, the process proceeds to a synthesis image reading routine of Step S714.

The image information read by the scanner 102 in the synthesis image reading routine of Step S714 is used to synthesized the synthesis image with the image synthesis area 42 in the layout area 4. In this synthesis, based on the information specified in the bar code area 2 and the mark sheet area 3, special processings, such as trimming, are performed on the synthesis image to synthesize it with the image synthesis area 42.

FIG. 4 illustrates a photograph 6 which is a synthesis original used in the embodiment. The area in the photograph 6 to be synthesized with the image synthesis area 42 in the layout specification area 4 is synthesis area 7 of FIG. 5. Therefore, the image included in the synthesis area 7 during reading of the synthesis original in Step S714 is developed in the image synthesis area 42.

When reading of the synthesis original 6 is completed, the process proceeds to reading completion routine of Step S715, wherein the LED-A 107 goes off to indicate to the user that reading of the synthesis original is completed.

When the synthesis original 6 is removed, the image data is in a printable state in Step S716. In this state, LED-B 108 turns on to indicate to the user that the image data is printable, after which the process proceeds to print paper setting determination routine of Step S717.

When, in Step 717, it is detected that print paper sheet is set by the print paper setting determination routine of Step S717, the process proceeds to a switch B 106 depression detection routine of Step S718.

When, in Step 718, it is detected that the user has depressed switch B 106 in the switch B 106 depression detection routine, it is determined that print start is specified by the user, and the process proceeds to a print start routine of Step S719.

When printing is started, the process proceeds to Step S720 wherein this printing state is indicated. During the printing, the LED-B 108 blinks to indicated to the user that printing is being performed.

During printing the first character area 41 and the second character area 43 are generated for the image specified in the layout area 4 in the specified color based on the information specified in the bar code area 2 and the mark sheet area 3. Since the synthesis area 7 obtained from the synthesis original 6 is developed in RAM 104, the image is generated in the image synthesis area 42 in the layout area. In addition, the illustration specified in the illustration specification area 5 is generated and printed based on the specified color information and positional information. The printed output, obtained by the above-described operation, is illustrated in FIG. 6.

After printing is completed and the process proceeds to Step S721, the process proceeds to Step S722, wherein LED-A 107 and LED-B 108 go off to indicate to the user that printing and all other image synthesis printing operations are completed.

Finally, the printed result 8 is discharged from the recording section in Step S723, thereby ending all processings at Step S726.

In the embodiment of the present invention, although the format original 1, as illustrated in FIG. 3, is produced successively by forming the areas starting from the bar code area 2, mark sheet area 3, layout area 4, and the illustration area 5, it is obvious that this order does not have to be followed and may be changed.

In addition, it is obvious that not all of the areas, bar code area, mark sheet area, layout area, and illustration area need to be included. For example, the mark sheet area 3, or the illustration area 5, or both the mark sheet area and the illustration area may be excluded from the format original.

Although, in the embodiment, an information processor having a scanner and recording device has been used as an example, it is obvious that a facsimile, electrophotographic device, a recording device with a scanner, a Japanese information processor with a scanner, computer, or the like, may be used for performing the same processings using the same original by the same procedures.

As describes above, in the information processing apparatus capable of synthesizing an image from information read by an optical scanner, the following advantages are obtained by forming on the format original an area where the original image is used as it is and a format specification area including at least one of information types regarding vertical writing specification, horizontal writing specification, synthesis image size, synthesis image direction, synthesis image synthesis position, whether or not there is synthesis image rotation, synthesis image rotation direction, synthesis image scaling direction, synthesis image scaling rate, image processing method of synthesis image, and color specification of the format area, to set the image synthesis format.

(1) In performing trimming or masking or image processing using a copying machine, the user can produce a synthesis image merely by successively inputting the original, the format original, and the synthesis image, making it unnecessary for him to perform complicated processings.

(2) In performing processings using a digital color copying machine or color printer connected to a PC, etc., a format original of the present invention is used so that even if the user is unfamiliar with the use of the image processing software, he can obtain a relatively satisfactory output result without repeating the trial and error method because the basic image processing settings are provided on the format original.

(3) The format original of the present invention includes a free portion provided by user setting, so that it is possible for the user to utilize his own creativity, as well as to feel less irritated by the circulation of the exact same post cards.

Second Embodiment

A description of the second embodiment of the present invention will be given in detail below with reference to the drawings.

Figure 18:
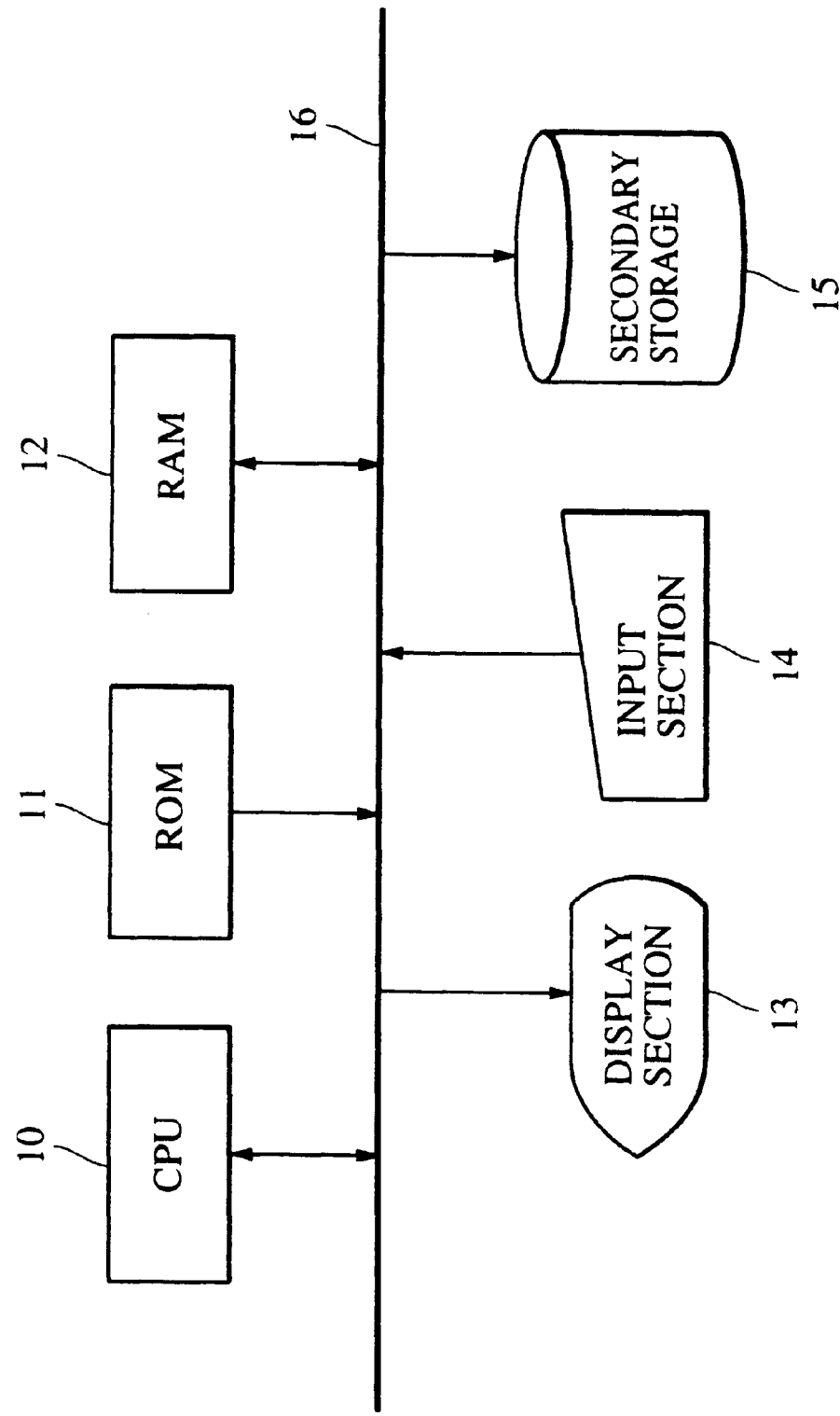
FIG. 18 is a block diagram illustrating a basic arrangement of an apparatus of this embodiment.

FIG. 18 is a block diagram illustrating a basic arrangement of the apparatus of the second embodiment. Referring to the figure, reference numeral 10 denotes a CPU, which executes various control operations in the apparatus. Reference numeral 11 denotes ROM, which stores a control program and various data, executed by the CPU 10. A control program illustrated in the flow chart (described later) is also stored in this ROM 11. Reference numeral 12 denotes RAM, which provides a working area during execution of the various control operations by the CPU 10. The apparatus may be constructed such that a control program, stored in a second storage 15 (described later), is loaded and stored in RAM 12 and the CPU 10 executes this program.

Reference numeral 13 denotes an indicator section for making indications of various processing results based on the indicator control of the CPU 10. Reference numeral 14 denotes an input section employed by the user to carry out various input operations. Reference numeral 15 denotes a secondary storage for storing various information in files. Reference numeral 16 denotes a bus which is connected to each of the above-described components and is used for information transmission and reception between each of the components.

Figure 10:
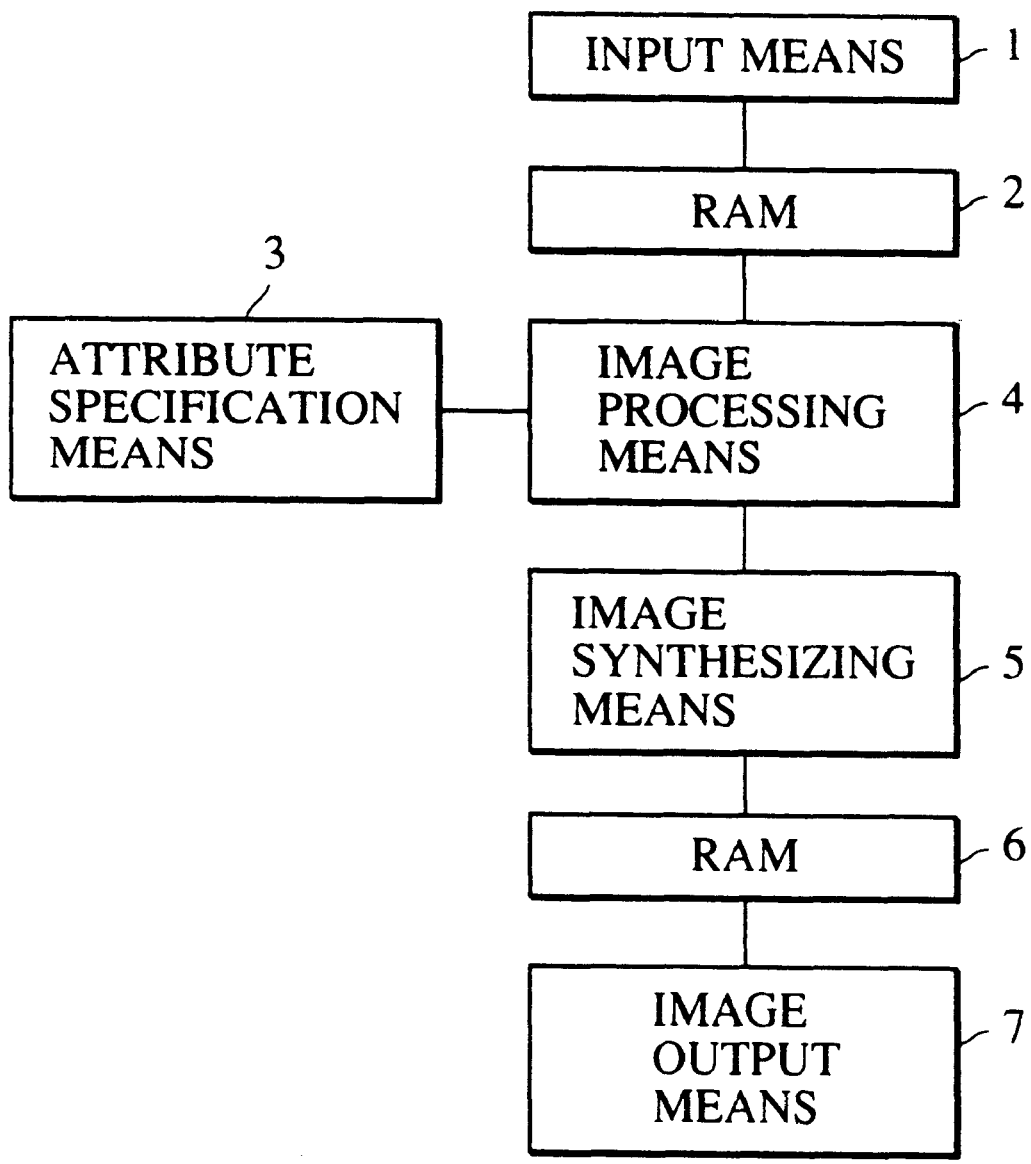
FIG. 10 is a block diagram illustrating a functional arrangement of the apparatus of a second embodiment.

FIG. 10 best illustrates the characteristics of the present invention. Referring to the figure, reference numeral 1 denotes an image data input means such as a scanner, video capture, magnetic storage device, etc. Reference numeral 2 denotes a buffer RAM for storing the image data read from the aforementioned input means. Reference numeral 3 denotes specifying means for specifying what kind of color or pattern is to be added to the input image data, which includes, for example, a keyboard, pointer device (e.g. mouse, etc.), or a device so constructed as allowing reading of data from the aforementioned scanner, magnetic storage device, or other input means. Reference numeral 4 denotes image processing means for performing processings, specified by the aforementioned specifying means, of the image data, stored in RAM 2. For example, the specified mesh pattern and the image data, stored in RAM 2, are ANDed to add a mesh pattern, and, in accordance with the specified color, the resultant data is converted to data including the color information. Reference numeral 5 denotes image synthesis means for synthesizing the plurality of different types of image data generated by the above-described processings carried out using the component parts 1 through 4 of the apparatus. Reference numeral 6 denotes RAM for storing the image data synthesized in the previous processing. The thus generated image data is output to image output means 7 such as a printer, magnetic storage device, indicator device (e.g. CRT, LCD, etc.), etc.

FIG. 11a shows an exemplary example of image data to be input and an image output result obtained by processings carried out by the apparatus and is used to describe the embodiment. Referring to the same figure, reference numerals 201, 202, and 203 each illustrate typical images to be input by the input means. These images are processed by the image processing means 4 and the image synthesis means 5. The image, which is finally output, is made up of three elements and is designated by reference numeral 204. The image 204 is an example of an image produced by the processings of the embodiment. It can be seen that each of the separated images have been subjected to image processings such as the addition of mesh patterns.

Although for purposes of simplifying the description of the above-described embodiment black-and-white images were used, the type of images which can be processed can be extended to color images. FIG. 11b illustrates color image data to be input to describe the embodiment and a color image output result obtained by processings carried out by the apparatus. Referring to the same figure, reference numerals 211, 212, and 213 each illustrate exemplary images to be input by the input means. These images are processed by the image processing means 4 and the image synthesis means 5. The image, which is finally output, is made up of three elements and is designated by reference numeral 214. Each of the separated image parts are designated by reference numeral 211 for the black part, reference numeral 212 for the orange part, and reference numeral 213 for the red part respectively. Reference numeral 214 denotes a color image output obtained by carrying out the processings of the embodiment. It can be seen that each of the separated images are colored and are synthesized into one image. More specifically, the color image is formed from three colors, black, orange, and red. FIG. 11c of FIG. 11 shows an example of color separation when color specification is done in 11b, wherein when black, orange, and red are specified, separation into the three primary colors, Y (yellow), M (magenta), and C (cyan), occurs during printing.

A description will be given of an image input illustrated in FIG. 11a.

Figure 12:
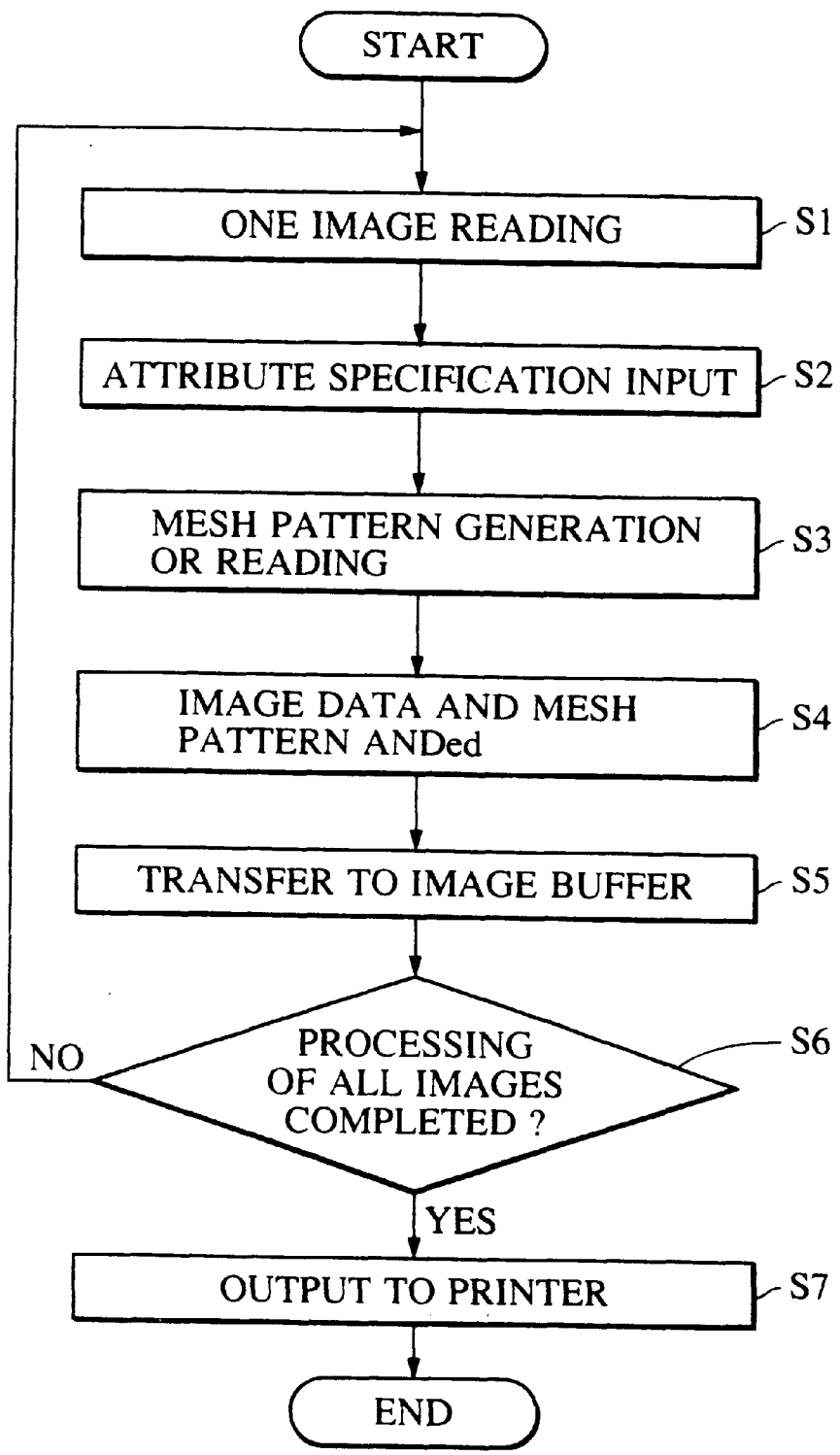
FIG. 12 is a flowchart illustrating a processing procedure to describe the second embodiment.

FIG. 12 is a flowchart illustrating the processing procedure of the embodiment, which will hereunder be used to describe the processing procedure. First, in Step S1, an image illustrated in FIG. 11a is read by a scanner. Here, it is assumed that image 201 of FIG. 11 is read. This image is stored in RAM 2 of FIG. 10. It is assumed that binary data is stored in RAM to simplify the following description. Next, in Step S2, an attribute specification is input, wherein it is assumed that a solid black pattern (a mesh pattern may also be used without departing from the essence of the present invention) is selected by the operation of a keyboard, indicating a selectable pattern. When the specification is input, then, in Step S3, the specified pattern is read from, for example, ROM, and generated by using a pattern generation algorithm. Thereafter, in Step S4, the generated pattern is ANDed with the image stored in the aforementioned RAM, after which, in Step S5, the resultant image is transferred to RAM 6 serving as the image buffer. In Step S6, a determination is made as to whether or not the processings have been completed for all of the images to be input. Here, there are still images to be processed, so that the process returns to Step S1. In the same way, the processings are performed on the image parts 202 and 203, and, then in Step S7, the image that is finally synthesized is output to the printer. A typical output result is designated by reference numeral 204 in FIG. 11.

A description will be given of the processing procedure of the input operation of the color image illustrated in FIG. 11b.

In Step S1 in FIG. 12, the image, illustrated in FIG. 11b, is read by a scanner. Here, it is assumed that either one of image parts 211, 212, or 213 is read. The read image is stored in RAM 2 of FIG. 10, wherein it will be assumed that binary data is stored in RAM to simplify the following description. Next, in Step S2, an attribute specification is input. Here, it will be assumed that an attribute is specified for each of the images. More specifically, black is attributed to image 211, orange to image 212, and red to image 213, in FIG. 11b. In Step S3, the YMC patterns for each of these colors are read from, for example, ROM, and generated using pattern generation algorithms (FIG. 11c). Then, in Step S4, the generated patterns are ANDed with the image, stored in the aforementioned RAM, to create three new image types corresponding to YMC. In Step S5, the resultant image types are transferred to RAM 6 serving as the image buffer. Next, in Step S6, a determination is made as to whether or not processings for all of the image types corresponding to the colors, black, orange, and red, are completed, so as to allow the processings on the three different image parts to be repeated. Here, the three different image data corresponding to YMC patterns obtained in Step S4 are ANDed in each of the processings performed respectively on the black, orange, and red image types. The image, which is finally synthesized in Step S7, is output to the printer. FIG. 11 shows an exemplary output result designated by reference numeral 214.

Although the images to be input in the above-described embodiment are input by inputting three different color image types, the black, the orange, and the red image types, it can also be input by inputting RGB, YMC, YMCK, or a plurality of other different color image types, without departing from the essence of the present invention.

Third Embodiment

A description will be given of the third embodiment. The basic arrangement of the apparatus of this embodiment is the same as that of the second embodiment (FIG. 18), so that its description will be omitted here.

Figure 13A:
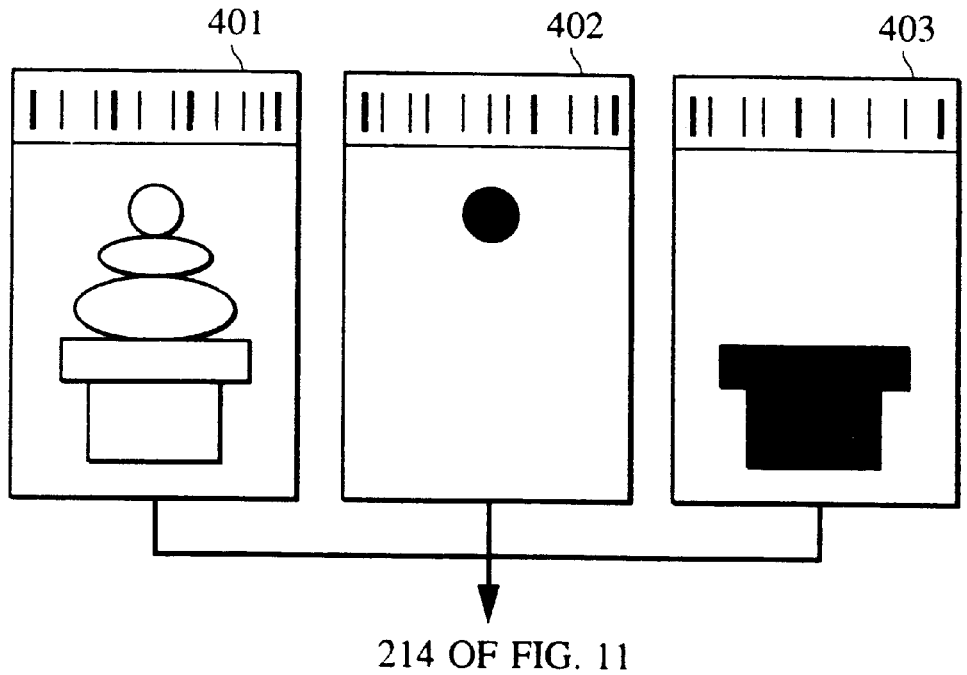
FIGS. 13a–13b is a view illustrating an exemplary example to describe a third embodiment.
Figure 13B:
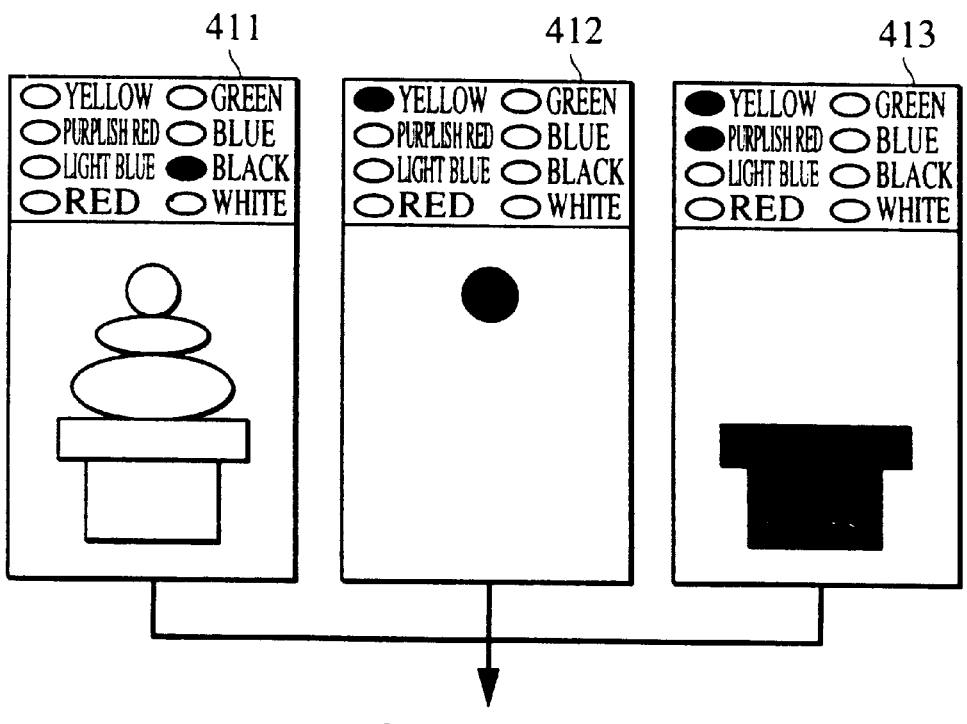

FIG. 13 is an example of separated reading data employed when other attribute specification means are used. FIG. 13a illustrates the case when bar codes are used as the attribute specification means. In this case, the patterns, color information, etc., are written for each of the previously separated data. FIG. 13b shows the case when mark sheets are used as the attribute specification means. In this case, the pattern, color type, etc. of the separated data are specified by the user, which is achieved by checking the data and reading these in. Although in the figure, there is no mark sheet for specifying the selected pattern, nor a mark sheet for limiting the color types, due to specification printing reasons, the actual area for checking can be enlarged to increase the number of items.

Figure 14:
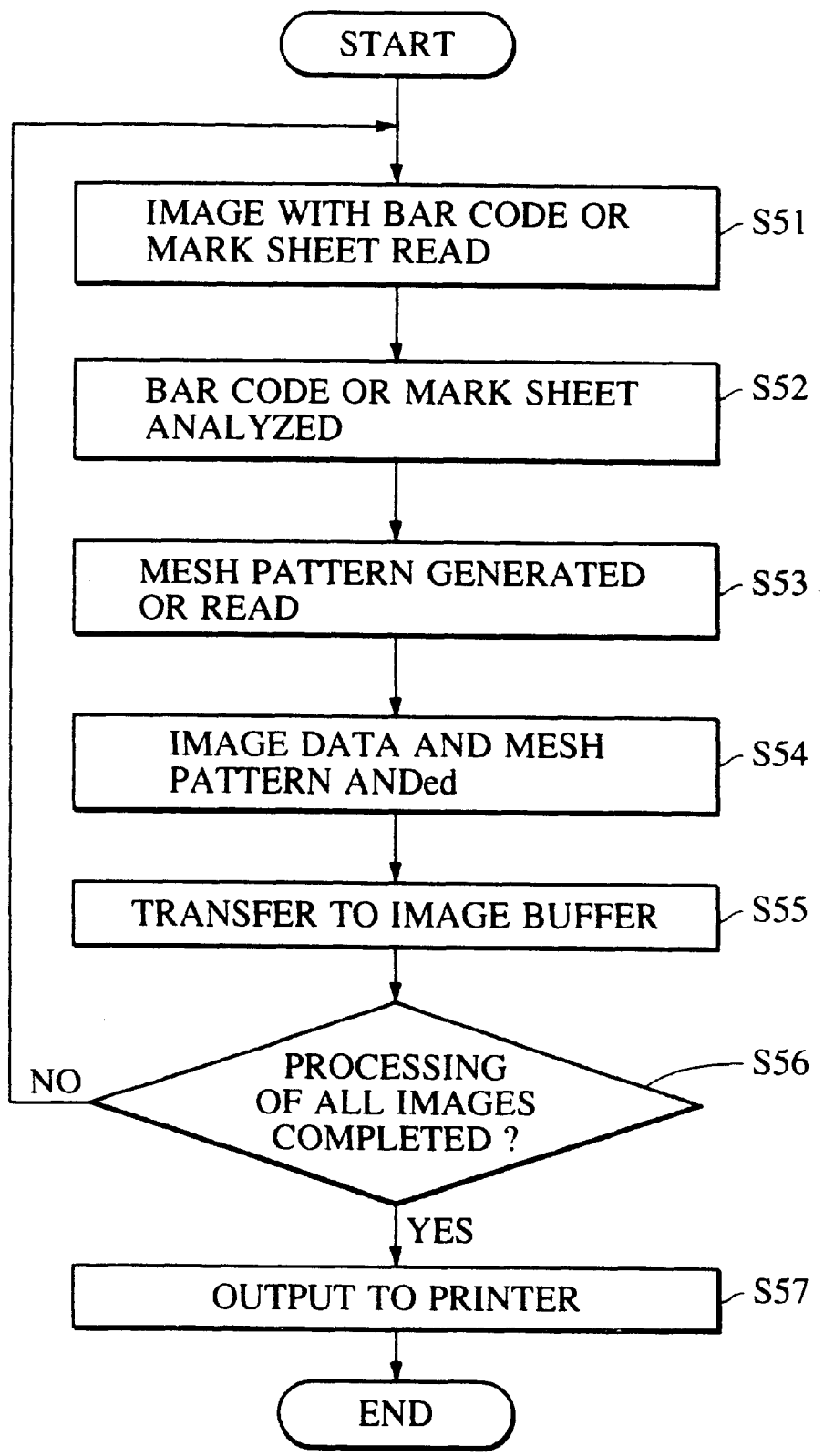
FIG. 14 is a flowchart illustrating a processing procedure to describe the third, a fourth, and a fifth embodiment.

FIG. 14, which is a flow chart illustrating the processings of the embodiment, will be used to describe the processings.

Figure 16:
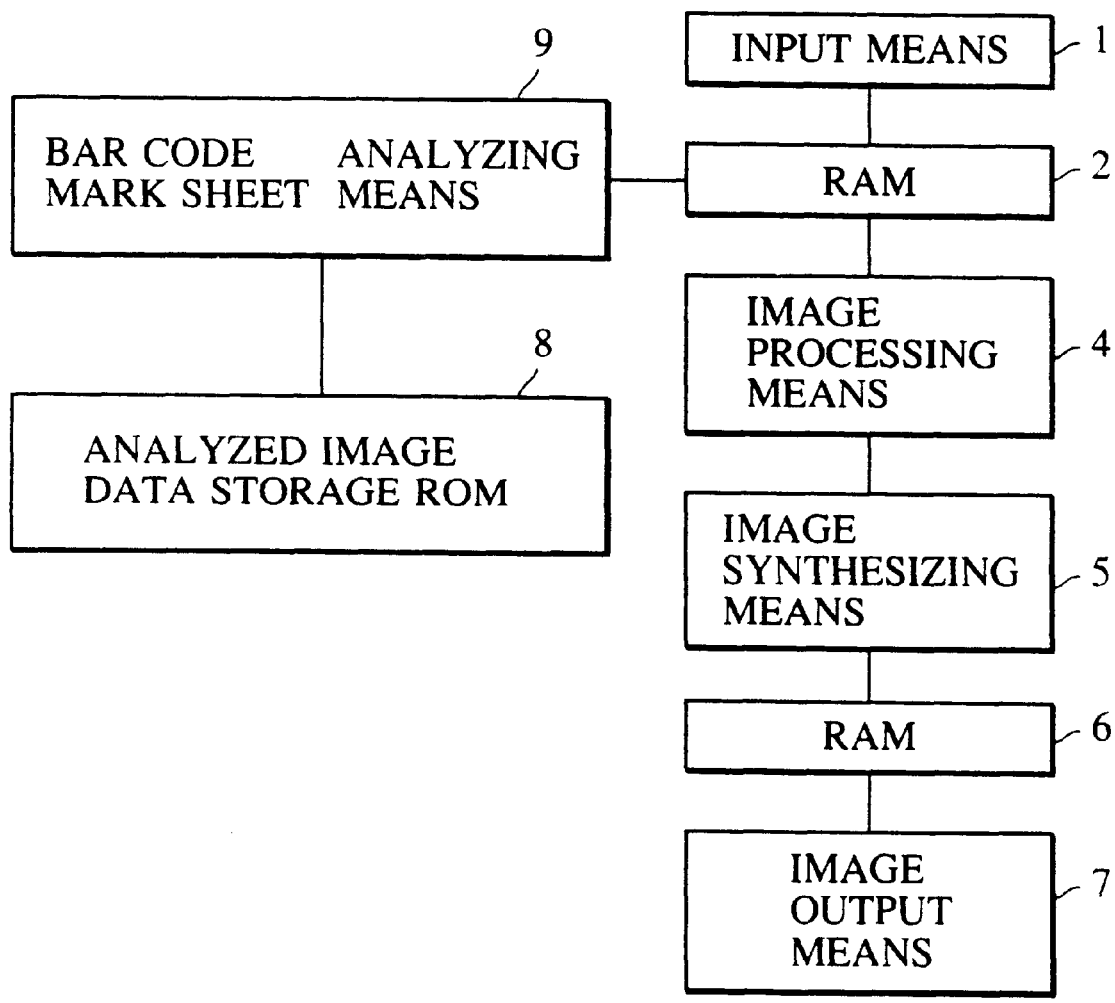
FIG. 16 is a block diagram showing an arrangement of an apparatus to describe the fifth embodiment.

FIG. 16 is a block diagram illustrating the characteristics of the embodiment. In the figure, the same component parts as those described in FIG. 16 will be given the same reference numerals. In the basic construction of FIG. 16, a bar code and mark sheet analyzing means (in FIG. 9) is used in place of the attribute specification means in the block diagram of FIG. 10, and ROM (in FIG. 8) is added to the basic arrangement of FIG. 10 to previously prepare separated image data. A detailed description will be give of the processings from the reading of data (of FIG. 13) to the obtainment of output result 214 of FIG. 11 with reference to the flow chart of FIG. 14. First, in Step S51, the image with bar code represented in reference numeral 401 of FIG. 13 or image with mark sheet also illustrated in FIG. 13 is read by a simple black-and-white scanner or the like. The read image is stored into RAM 2 of FIG. 16, which is divided into a bar code section or mark sheet section and data section. Although to simplify the following description, it will be assumed here that the data is stored as binary data in RAM, it may be stored as multi-valued data. Next, in Step S52, the bar code section or mark sheet section in which attributes have been specified, is analyzed. In Step S53, from the analyzed result, the specified pattern is read from, for example, ROM, and generated using a pattern generation algorithm. The generated pattern is ANDed with the image stored in the data section in RAM. A generated pattern data is transferred to RAM 6 serving as the image buffer of FIG. 16 in Step S55. Thereafter, in Step S56, a determination is made as to whether or not the processings on all of the images to be input are completed. If not, the process returns back to Step S51. After the same steps have been carried out and all of the images have been processed, the process proceeds to the final Step S57 in which the finally synthesized image is output to the printer. The printed output is as illustrated by the image represented by reference numeral 214 as it has been illustrated for the second embodiment.

Fourth Embodiment

A description will be give of the fourth embodiment. The basic arrangement of the apparatus of the embodiment is the same as that of the second embodiment (FIG. 18), so that its description will be omitted here.

In the above-described third embodiment, each of the image types, separated in accordance with the pattern or color, have added thereto the aforementioned bar codes or mark sheets, and reading is successively repeated until all of the images are read. In this embodiment, however, bar codes or mark sheets are added for the separated image set, so as to make possible one reading of data, which results in a more simplified processing in a shorter period of time. In this case, this can be achieved by RAM 2 of FIG. 10 divided into three parts, with bar code or mark sheet sections and image data sections. The processing procedure is described using the flowchart illustrated in the third embodiment, wherein the attribute specification means data divided and stored in RAM 2 of FIG. 10 in Step S52 is analyzed, after which, in Step S53, mesh pattern generation or reading is carried out for each of the data. As in Step S54, these are ANDed and color is added to the images. While each of the processed image data are synthesized, the synthesized results are transferred to the image buffer in Step S55. This allows output to the printer in one loop, so that Step S57 in FIG. 14, in which checking is carried out as to whether or not all of the images have been processed, can be omitted. As in the second and third embodiments, the output result is as shown by the image designated by reference numeral 214 in FIG. 11.

Fifth Embodiment

A description will be given of the fifth embodiment. The basic arrangement of the apparatus of the embodiment is the same as that of the second embodiment (FIG. 18), so that its description will be omitted here.

In this embodiment, the same output result as that obtained in the second, third, and fourth embodiments can be obtained by merely adding the image data type in the bar code or mark sheet, each of which is an attribute specification means, and reading this attribute specification means, so that reading of the separated image data, performed in the third embodiment, does not have to be carried out.

FIG. 16 illustrates characteristics of the embodiment described in the third embodiment, wherein the basic components designated by reference numeral 1 up to reference numeral 7 are the same as those of FIG. 10. Reference numeral 9 denotes analysis means for analyzing bar codes or mark sheets of the embodiment, while reference numeral 8 denotes ROM for preparing image data previously created and separated.

FIG. 17 illustrates a bar code and mark sheet representing the attribute specification and prepared image data type, which are data to be read in the embodiment. Referring to the figure, reference numeral 801 represents a bar code example in which attribute and image types are specified to obtain the image 214 of FIG. 11. Reference numeral 802 denotes a mark sheet example in which attribute and image types are also specified as bar code 801. Reference numeral 803 each denote an image data example representing each of he specifications stored in ROM. To obtain the image 214 of FIG. 11, the same processings are carried out as in the third and fourth embodiments, except that only an additional step is included after the bar code or mark sheet has been analyzed between Steps S52 and Steps S53 in FIG. 14, wherein the specified image is called from ROM 8 of FIG. 7.

As described above, the image processing procedure using means of the present invention and the construction of the apparatus makes it possible to reduce the size and cost of the apparatus and to provide a high quality image processing even when a black-and-white reader is used, which is particularly true when color output is being performed.

In addition, using bar codes or mark sheets as the attribute specification means allows very simple color image output to be achieved, so that the user does not have to use external input devices such as keyboards and further busy his hands.

Sixth Embodiment

A description will be given of the sixth embodiment. The basic arrangement of the apparatus of the embodiment is the same as those of the second embodiment (FIG. 18), so that its description will be omitted here. A simple description of the embodiment will be given, since this embodiment consists in the use of a color handling means as the attribute specification means 3.

Figure 19:
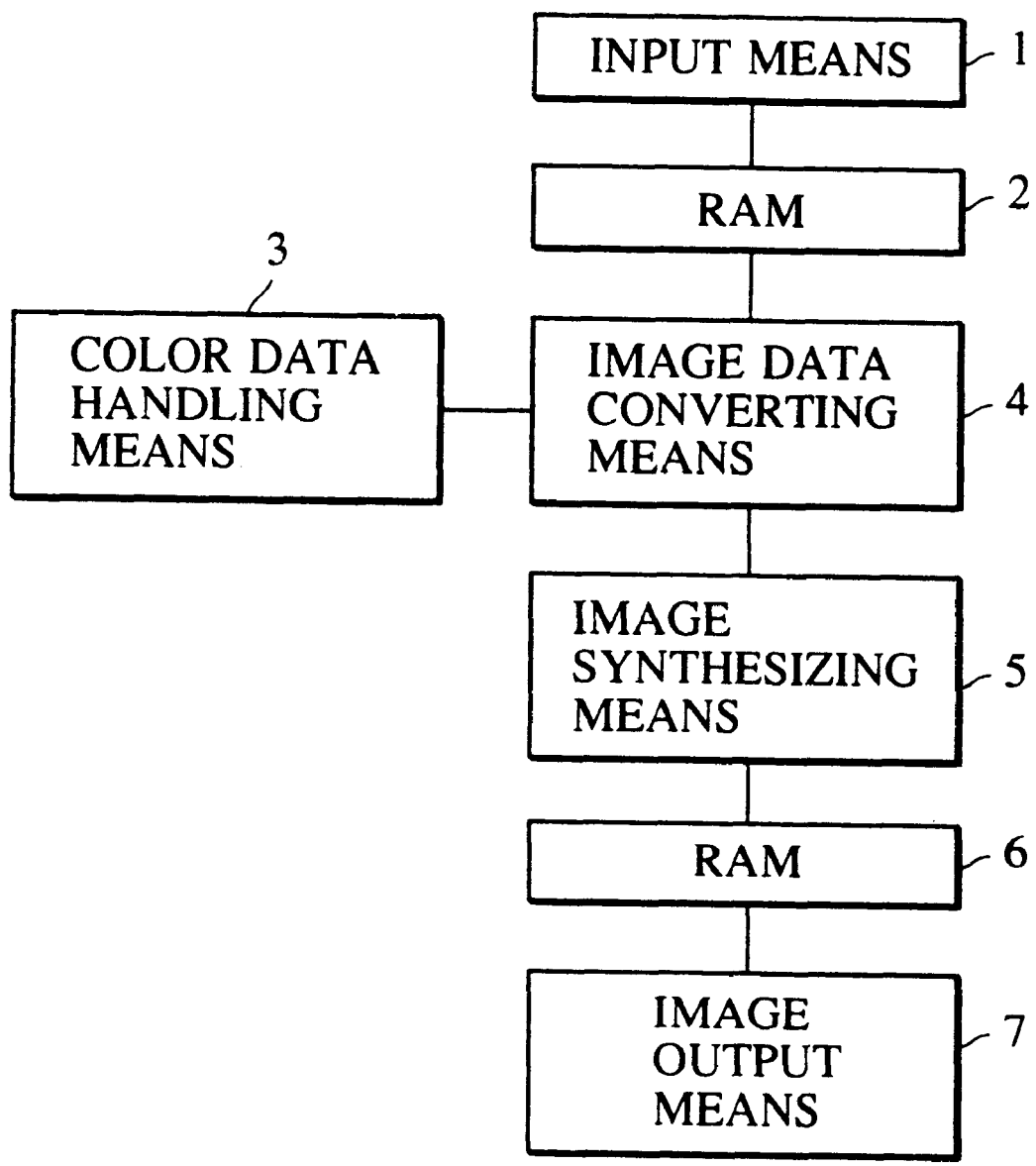
FIG. 19 is a block diagram illustrating a functional arrangement of an apparatus of a sixth embodiment.

FIG. 19 best illustrates the characteristics of the present invention, wherein reference numeral 1 denotes an image data input means such as a scanner, video capture, magnetic storage device, etc. Reference numeral 2 denotes buffer RAM for storing the image data read from the aforementioned input means. Reference numeral 3 denotes specifying means for specifying what type of colors or patterns are to be added with respect to the input image data, which, for example, includes a pointer device such as a keyboard or mouse or a device which allows reading in the same way from the aforementioned input means such as a scanner or magnetic storage device. Reference numeral 4 denotes an image data conversion means for allowing processings, specified by the aforementioned specification means 4, to be performed on the image data stored in RAM 2. For example, the specified mesh pattern and the image data stored in RAM 2 are ANDed and patterns or color information in accordance with the specified colors are added to produce converted data including these information. Reference numeral 5 denotes an image synthesis means for synthesizing a plurality of different types of image data produced by the processings carried out using the above-described components 1 to 4. Reference numeral 6 denotes RAM for storing image data synthesized by the previous processing. The thus generated image data is output to an image output means 7 such as a printer or magnetic storage device, or display devices such as a CRT or LCD.

Figure 20A:
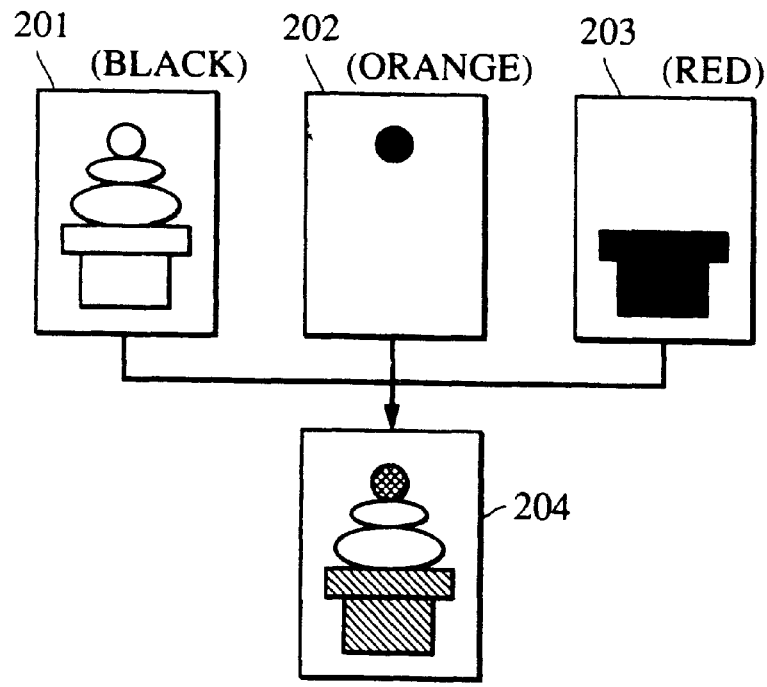
FIGS. 20a–20b is an exemplary diagram of an example to describe the sixth embodiment.
Figure 20B:
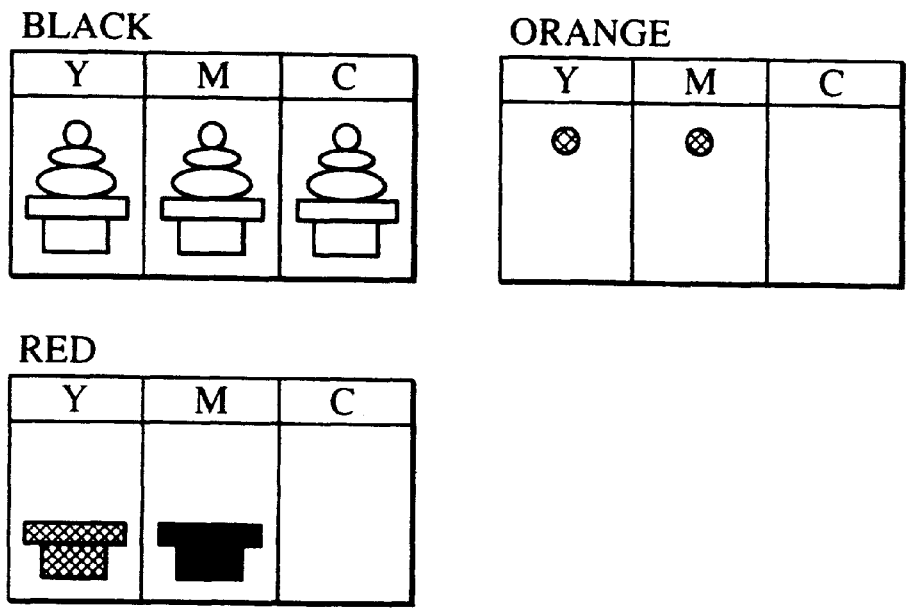

FIG. 20a, which is an exemplary example of image data to be input and the image output produced by the process carried out by using the apparatus, is used to explain the embodiment. Referring to the same figure, reference numerals 201, 202, and 203 each denote an exemplary image to be input by the input means, in which it is assumed that the final image to be output by the processing of the embodiment is composed of three elements, specified respectively as black, orange, and red. Reference numeral 204 denotes an output image obtained by performing the processings of the embodiment. It can be seen that image processings such as coloring or adding mesh pattern have been performed on each of the separated images. FIG. 20b illustrates color separation of each of the images 201, 202, and 203, each of which are specified a color, black, orange, or red. The images of FIG. 20a are subjected to color separation in the three primary colors of printing, Y (yellow), M (magenta), and C (cyan).

A description will be given of the processing procedure of the sixth embodiment with reference to FIG. 12. First, in Step S1, an image, illustrated in FIG. 20a, is read by a scanner. Here, it is assumed that either of images 201, 202, or 203 are read. The read image is stored in RAM 2 of FIG. 19, wherein it is assumed that the image is stored as binary data to simplify the following description. Thereafter, in Step S2, an attribute specification is input, wherein it is assumed that an attribute to be specified with respect to each of the images is fixed. More specifically, in FIG. 20a, the attribute for image 201 is black, that for image 202 is orange, and that for image 203 is red. In Step S3, a YMC pattern, which corresponds to each of these colors, is read, for example, from ROM and is generated using a pattern generation algorithm (FIG. 20b). Then, in Step S4, each generated pattern is ANDed with an image store in the aforementioned RAM to create three types of images corresponding to a new YMC pattern. In Step S5, these images are transferred to the image buffer RAM 6 of FIG. 19. In Step S6, a determination is made as to whether or not the processings for the three image types corresponding to black, orange, and red are completed, so as to allow the processings to be repeated for the three image types. In the processings, the three image data types corresponding to YMC pattern obtained in Step S4 are ANDed. Thereafter, The images 201, 202, and 203 of FIG. 20*a* are processed respectively, and the image finally synthesized in Step S7 is output to the printer. An exemplary image output is as shown by the image 204 of FIG. 20.

What is claimed is:

1. An image processing apparatus comprising:

reading means for reading an original image and a specification image which includes specification information, which specifies an area on the original image within which image processing is performed, with no such specification information being included on the original image, and a composite image for performing a compound output with the original image;

obtaining means for analyzing the specification image to obtain specification information;

processing means for processing original image data obtained by reading the original image based on the specification information; and output means for outputting an output image which is produced by compounding the original image processed by said processing means with the composite image read by said reading means.

2. An image processing apparatus according to claim 1, wherein said output means performs printing based on the original image data processed by said processing means.

3. An image processing apparatus according to claim 1, further including specification data included on the specification image.

4. An image processing apparatus according to claim 1, wherein the contents of the processings to be performed on the specification image are represented by bar codes.

5. An image processing apparatus according to claim 1, wherein the contents of the processings to be performed to obtain the specification image are represented on mark sheets.

6. An image processing apparatus according to claim 1, wherein the specification image is formed in a predetermined area on an original, and the original image is formed in another area.

7. An image processing apparatus according to claim 1, wherein the specification image is represented in at least two different forms.

8. An image processing apparatus according to claim 7, wherein the specification image is represented in two different forms by bar codes or mark sheets.

9. An image processing method comprising:

a reading step of reading an original image and a specification image which includes specification information, which specifies an area on the original image within which image processing is performed, with no such specification information being included on the original image, and a composite image for performing a compound output with the original image;

an obtaining step of analyzing the specification image to obtain specification information;

a processing step of processing original image data obtained by reading the original image based on the specification information; and an output step of outputting an output image which is produced by compounding the original image processed by said processing step with the composite image read by said reading step.

10. An image processing method according to claim 9, wherein in the outputting step, printing is performed based on the original image data process in the processing step.

11. An image processing method according to claim 9, further including specification data included on the specification image.

12. An image processing method according to claim 9, wherein the contents of the processings to be performed to produce the specification image is represented by bar codes.

13. An image processing method according to claim 9, wherein the contents of the processings to be preformed to produce the specification image is represented in mark sheets.

14. An image processing method according to claim 9, wherein the specification image is formed in a predetermined area of one original, and the original image is formed in another area.

15. An image processing method according to claim 9, wherein the specification image is represented in at least two different forms.

16. An image processing method according to claim 15, wherein the specification image is represented in two different forms by bar codes or mark sheets.

17. A computer readable medium having recorded thereon codes for implementing a computer implementable method of image processing comprising:

a reading step of reading an original image and a specification image which includes specification information, which specifies an area on the original image within which image processing is performed, with no such specification information being included on the original image, and a composite image for performing a compound output with the original image;

an obtaining step of analyzing the specification image to obtain specification information;

a processing step of processing original image data obtained by reading the original image based on the specification information; and an output step of outputting an output image which is produced by compounding the original image processed by said processing step with the composite image read by said reading step.

* * * * *